United States Patent
Yui et al.

(10) Patent No.: US 7,768,576 B2
(45) Date of Patent: *Aug. 3, 2010

(54) MULTI-SCREEN SYNTHESIS APPARATUS, METHOD OF CONTROLLING THE APPARATUS, AND PROGRAM FOR CONTROLLING THE APPARATUS

(75) Inventors: Hideaki Yui, Kanagawa (JP); Takashi Tsunoda, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1024 days.

This patent is subject to a terminal disclaimer.

(21) Appl. No.: 11/464,470

(22) Filed: Aug. 14, 2006

(65) Prior Publication Data

US 2006/0290817 A1    Dec. 28, 2006

Related U.S. Application Data

(63) Continuation of application No. 10/404,911, filed on Apr. 1, 2003, now Pat. No. 7,119,849.

(30) Foreign Application Priority Data

Apr. 1, 2002    (JP)    ............................... 2002-098834

(51) Int. Cl.
  H04N 5/45    (2006.01)
  G09G 5/00    (2006.01)
  G06F 3/00    (2006.01)

(52) U.S. Cl. ................ 348/564; 348/565; 348/569; 348/580; 348/581; 348/585; 348/588; 348/598; 348/716; 345/660; 345/667; 715/716

(58) Field of Classification Search ................ None
See application file for complete search history.

(56) References Cited

U.S. PATENT DOCUMENTS

| 5,343,250 | A  | 8/1994  | Iwamura         |
| 5,530,797 | A  | 6/1996  | Uya et al.      |
| 5,621,429 | A  | 4/1997  | Yamaashi et al. |
| 5,635,984 | A  | 6/1997  | Lee             |
| 5,682,207 | A  | 10/1997 | Takeda et al.   |
| 5,815,216 | A  | 9/1998  | Suh             |
| 5,880,728 | A  | 3/1999  | Yamaashi et al. |
| 6,204,887 | B1 | 3/2001  | Hiroi           |
| 6,230,121 | B1 | 5/2001  | Weber           |
| 6,335,764 | B1 | 1/2002  | Hashimoto et al.|
| 6,384,868 | B1 | 5/2002  | Oguma           |
| 6,441,863 | B1 | 8/2002  | Miyazaki et al. |

(Continued)

Primary Examiner—Brian P Yenke
(74) Attorney, Agent, or Firm—Rossi, Kimms & McDowell LLP

(57) ABSTRACT

There is provided a multi-screen synthesis apparatus that can execute display of video data and update of an OSD image without causing a user to feel a visual sense of incongruity, and reduce system costs. Periodic video source data and aperiodic OSD image data are written into a unified memory reserved for planes. The video source data and the OSD image data are read from the unified memory, based on a synthesis layout, for simultaneous display on a single display in a synthesized state. Video data to be written into the unified memory is decimated in units of a frame on an input video source-by-input video source basis. The decimation of the data is controlled based on display priority of the video data determined based on a multi-screen display layout.

6 Claims, 19 Drawing Sheets

U.S. PATENT DOCUMENTS

| | | |
|---|---|---|
| 6,473,088 B1 | 10/2002 | Matsumoto et al. |
| 6,501,441 B1 | 12/2002 | Ludtke et al. |
| 6,678,006 B1 | 1/2004 | Velez et al. |
| 6,701,526 B1 | 3/2004 | Trovato |
| 6,868,332 B2 | 3/2005 | Hashimoto |
| 6,885,406 B2 | 4/2005 | Yui et al. |
| 6,918,132 B2 | 7/2005 | Gargi |
| 6,933,955 B2 | 8/2005 | Crocitti et al. |
| 7,589,789 B2 * | 9/2009 | Choi .......................... 348/441 |
| 7,602,406 B2 * | 10/2009 | Gray et al. ................... 345/634 |
| 7,633,487 B2 * | 12/2009 | Azami et al. ................. 345/157 |
| 2008/0001972 A1 * | 1/2008 | Callway et al. ............. 345/660 |

* cited by examiner

MULTI-SCREEN BACKGROUND DATA

GUI DATA

MULTI-SCREEN BACKGROUND DATA

GUI DATA

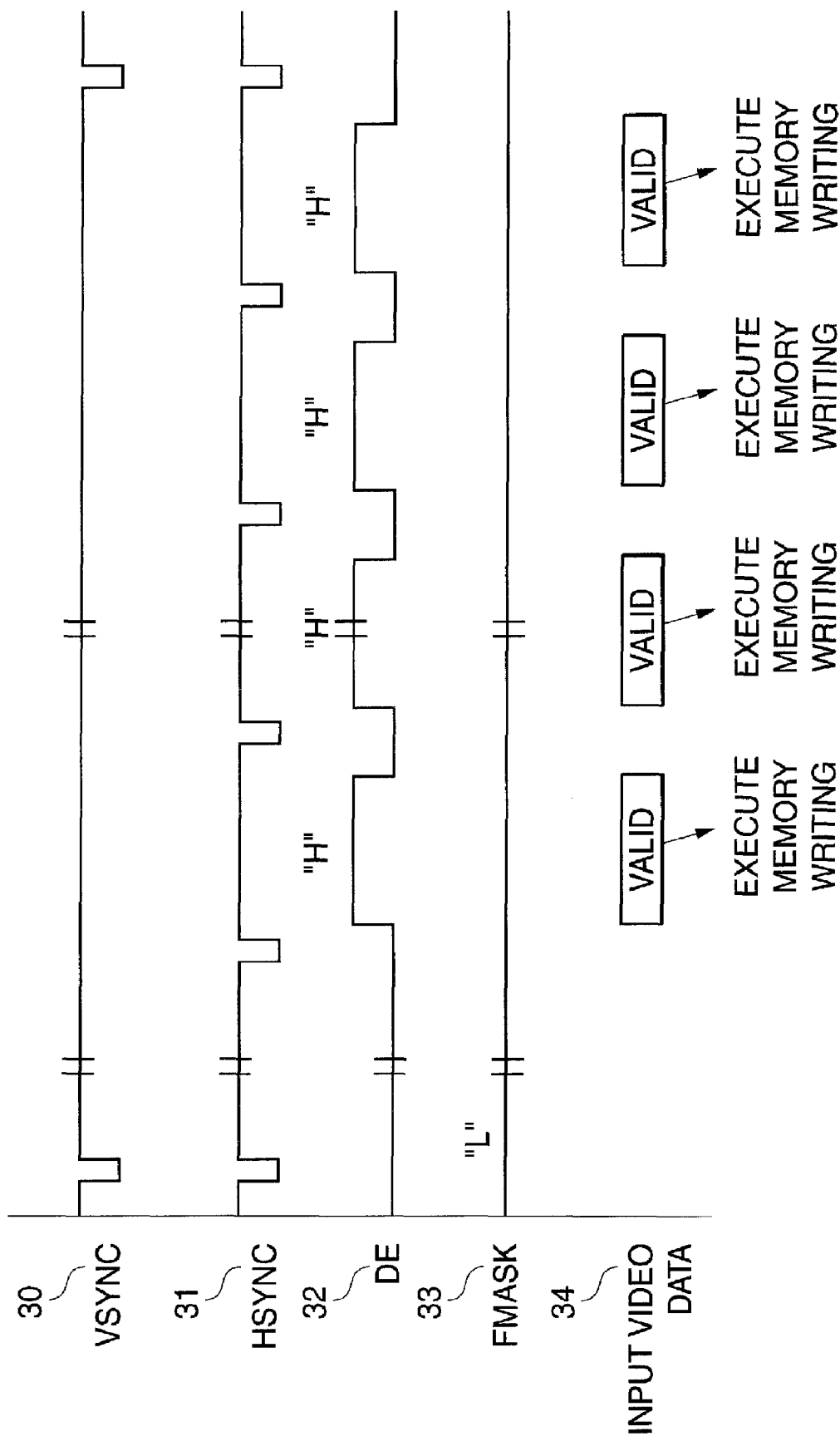

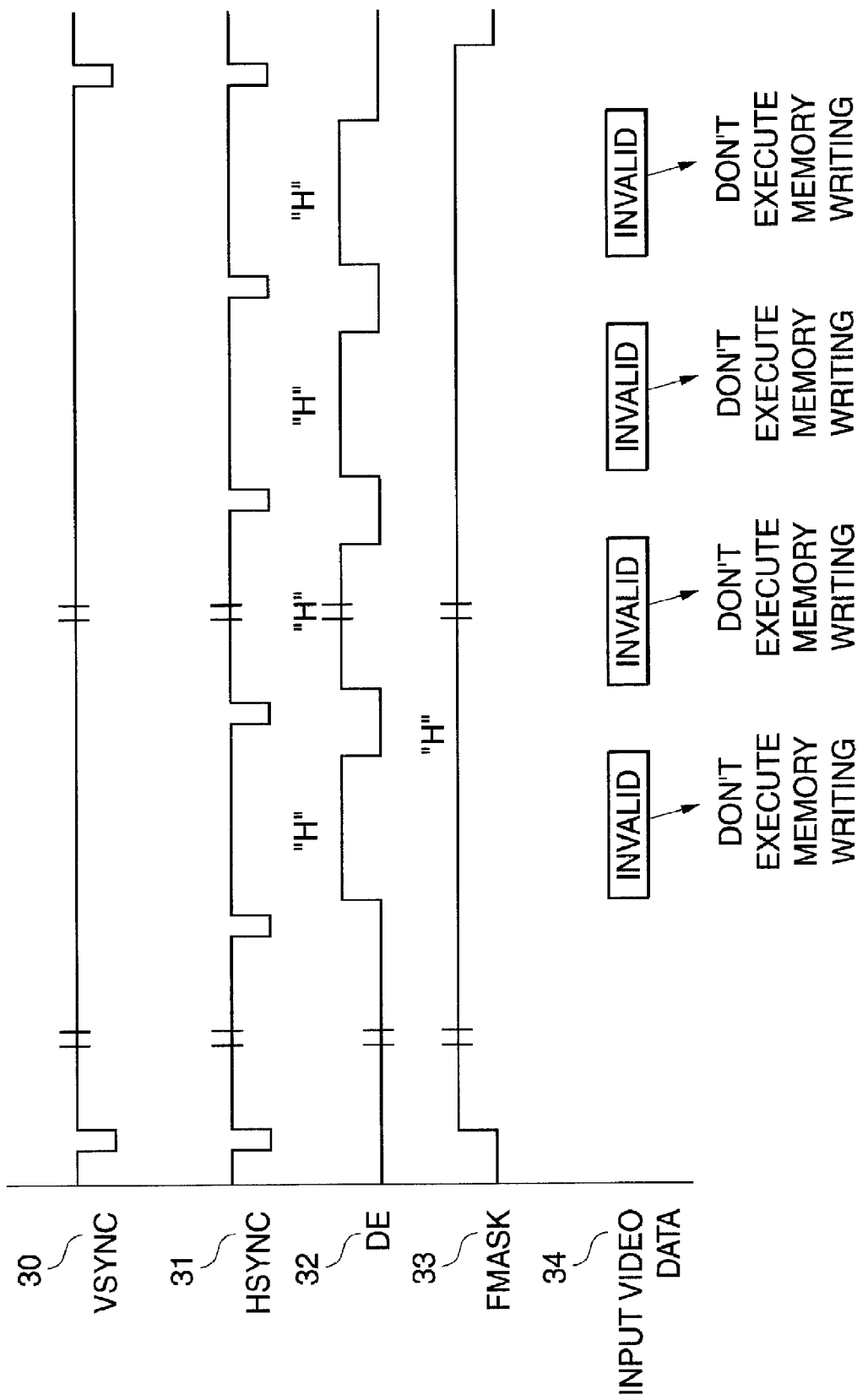

MULTI-SCREEN SYNTHESIS APPARATUS, METHOD OF CONTROLLING THE APPARATUS, AND PROGRAM FOR CONTROLLING THE APPARATUS

This is a continuation of application Ser. No. 10/404,911, filed 1 Apr. 2003.

BACKGROUND OF THE INVENTION

1. Field of the Invention

The present invention relates to a multi-screen synthesis apparatus that controls a unified memory included, e.g., in a digital TV receiver having a multi-screen display function, and a control method and control program for controlling the multi-screen synthesis apparatus.

2. Description of the Related Art

Nowadays, in the broadcasting industry, a shift from analog ground wave broadcasting to BS/CS digital broadcasting, i.e., so-called "digitalization of broadcasting," is proceeding. With the progress of this shift, there is a rising trend of change in the role of a TV set from "amusement means in a living room" to "home information window". This trend toward digitalization of broadcasting causes an increase in the number of programs transmitted to homes (multi-channeling) and enhancement in definition or resolution (increase in transmitted information) from SD (Standard Definition) to HD (High Definition).

In this movement, the role of a display device is also changing. More specifically, the display device tends to have a larger and higher definition screen so as to express realistic pictures full of presence in a living room of a home. A typical example is, e.g., a PDP (plasma display) of over 50 inches. Conventionally, demands for the display devices of this class have been limited to those for business uses in public facilities. However, it is now expected that with reduction of manufacturing costs in the future, they will be also used in homes. Further, it is inevitable that a receiver (set top box) having higher performance will have to be produced at lower costs.

In accordance with the above-mentioned digitalization of broadcasting and use of large-sized and enhanced-definition display devices, the expectation is that a display mode called "multi-screen display" which enables simultaneous display of various media on a single display device serves as one of means for making a TV set the "home information window".

Some recent TV receivers are already equipped with a function of receiving programs over two channels simultaneously and displaying these simultaneously on a display screen, and there is a high possibility that the number of screens or windows displayed on the display screen will increase depending on the purposes of watching TV.

Further, with digitalization of broadcasting, TV broadcasting has come to serve not only as means for simply transmitting video images in only one direction, but also as means for enabling interactive communication between each user and a broadcasting station. A typical example of this type of broadcasting is data broadcasting.

The data broadcasting is achieved by developing a teletext broadcasting system employed by the conventional analog broadcast, in which a TV station provides information to viewers in one way only, into an advanced system in which new services, such as interactive and on-demand type multimedia services, are added. Various broadcast services typified by program-interlocking services, EPG (Electronic Program Guide) services, e-commerce, and data distribution, are now being considered for data broadcasting.

The data broadcasting is standardized by the Association of Radio Industries and Businesses (ARIB) in Japan, and details of the standardized data broadcasting are described in an ARIB standard document (ARIB STD B-24: Specification of Data Coding System and Transmission System for Digital Broadcasting). This standard stipulates a requirement that the receiver should have a display capability of smoothly synthesizing graphical user interface (GUI), similarly to the personal computer. It is also required that the GUI display should be capable of displaying not only the above-mentioned data broadcasting, but also GUI screens, on an as-needed basis, for operation support enabling easy control of various devices (a digital camera, a digital video tape recorder, a DVD recorder or player, a DVHS deck, etc.) connected to a TV, from the TV side.

From the above-mentioned background, it is desired to realize in the future a home-use receiver which is capable of performing simultaneous display of a plurality of broadcast video screens and video images from a peripheral device or apparatus, on a multi-screen without causing a viewer to feel a sense of incongruity, and smoothly displaying graphics of a GUI screen of a data broadcast, a user interface (UI), or the like, without causing the viewer to feel a sense of incongruity. Further, it is desired to realize these display functions at low costs.

One conventional method to realize the multi-screen display functions mentioned above is to temporally store input sources different in frame rate in a memory, and then read them from the memory in synchronism with a fresh rate of a display device, for synthesized output. It is known that in this case a control method is employed in which a frame memory is controlled as a unified memory using the UMA (Unified Memory Architecture), so as to reduce system costs.

In this case, a transfer rate demanded of the frame memory (memory transfer rate) is generally determined by a method of calculating the same based on a total of all simultaneously available transfer rates, by using the following inequality (1):

$$\text{memory transfer rate} > \Sigma(\text{input rate}) + \Sigma(\text{output rate}) \quad (1)$$

However, in a digital television having the multi-screen display function, if its memory transfer rate is determined based on the total of all transfer rates, the frequency of a memory transfer clock becomes very high.

Detailed explanation of this will be given below (only as one example).

First, parameters necessary for estimating transfer capacity are set as follows:

HD video input (YcbCr444): 24 bits, 75 MHz (1)

HD video output (YcbCr444): 24 bits, 75 MHz (2)

OSD image (YcbCr444): 24 bits, 75 MHz (3)

OSD image (INDEX color): 8 bits, 75 MHz (4)

The above requirement (1) is for inputting a hi-vision video.

The above requirement (2) is for outputting a hi-vision video.

The above parameter (3) is for drawing an OSD image in a still picture plane for data broadcasting.

The above requirement (4) is for drawing an OSD image in text & graphic and subtitle planes for data broadcasting.

(1) When a two-screen multi-window is formed by two channels of video inputs and three channels of OSD images, a unified memory is reserved for the following planes:

moving picture plane 0 (from (1) parameters): 1280×720×24 moving picture plane 1 (from (1) parameters): 1280×720×24

OSD plane 0 (from (3) parameters): 1280×720×24

(This plane corresponding to a still picture plane in the ARIB specification.)

OSD plane 1 (from (4) parameters): 640×360×8

(This plane corresponds to a text & graphic plane in the ARIB specification.)

OSD plane 2 (from (4) parameters): 640×360×8

(This plane corresponds to a subtitle plane in the ARIB specification.)

Specifications required of the unified memory are calculated as follows:

$$\sum (\text{maximum input rate}) = (\text{transfer capacity of } (1))) \times 2 +$$
$$\text{transfer capacity of}(3) + (\text{transfer capacity of}(4)) \times 2 =$$
$$(24 \text{ bits} \times 75 \text{ MHz} \div 8) \times 2 + (24 \text{ bits} \times 75 \text{ MHz} \div 8) +$$
$$(8 \text{ bits} \times 75 \text{ MHz} \div 8) \times 2 =$$
$$450 \text{ } MB/S + 225 \text{ } MB/S + 150 \text{ } MB/S = 825 \text{ } MB/S$$

$$\sum (\text{maximum output rate}) =$$
$$(\text{transfer capacity of } (2)) + \text{transfer capacity of}(3) +$$
$$(\text{transfer capacity of}(4)) \times 2 = (24 \text{ bits} \times 75 \text{ MHz} \div 8) +$$
$$(24 \text{ bits} \times 75 \text{ MHz} \div 8) + (8 \text{ bits} \times 75 \text{ MHz} \div 8) \times 2 =$$
$$225 \text{ } MB/S + 225 \text{ } MB/S + 150 \text{ } MB/S = 600 \text{ } MB/S$$

Required memory bandwidth =

$$\sum (\text{maximum input rate}) + \sum (\text{maximum output rate}) =$$
$$825 \text{ } MB/S + 600 \text{ } MB/S = 1425 \text{ } MB/S$$

Assuming that the transfer efficiency of the memory is 65%, the following equations are obtained:

effective memory bandwidth=required memory bandwidth×(100÷65)≈2.2 GB/S required memory capacity≈8.56 MB.

(2) When a four-screen multi-window is formed by four channels of video inputs of and three channels of OSD images, a unified memory is reserved for the following planes:

moving picture plane 0 (from (1) parameters): 1280×720×24 moving picture plane 1 (from (1) parameters): 1280×720×24 moving picture plane 2 (from (1) parameters): 1280×720×24 moving picture plane 3 (from (1) parameters): 1280×720×24

OSD plane 0 (from (3) parameters): 1280×720×24

(This plane corresponding to a still picture plane in the ARIB specification.)

OSD plane 1 (from (4) parameters): 640×360×8

(This plane corresponds to a text & graphic plane in the ARIB specification.)

OSD plane 2 (from (4) parameters): 640×360×8

(This plane corresponds to a subtitle plane in the ARIB specification.)

Specifications required of the unified memory are calculated as follows:

$$\sum (\text{maximum input rate}) =$$
$$(\text{transfer capacity of } (1)) \times 4 + \text{transfer capacity of}(3) +$$
$$(\text{transfer capacity of}(4)) \times 2 = (24 \text{ bits} \times 75 \text{ MHz} \div 8) \times 4 +$$
$$(24 \text{ bits} \times 75 \text{ MHz} \div 8) + (8 \text{ bits} \times 75 \text{ MHz} \div 8) \times 2 =$$
$$900 \text{ } MB/S + 225 \text{ } MB/S + 150 \text{ } MB/S = 1275 \text{ } MB/S$$

$$\sum (\text{maximum output rate}) =$$
$$(\text{transfer capacity of } (2)) + \text{transfer capacity of}(3) +$$
$$(\text{transfer capacity of}(4)) \times 2 = (24 \text{ bits} \times 75 \text{ MHz} \div 8) +$$
$$(24 \text{ bits} \times 75 \text{ MHz} \div 8) + (8 \text{ bits} \times 75 \text{ MHz} \div 8) \times 2 =$$
$$225 \text{ } MB/S + 225 \text{ } MB/S + 150 \text{ } MB/S = 600 \text{ } MB/S$$

Required memory bandwidth =

$$\sum (\text{maximum input rate}) + \sum (\text{maximum output rate}) =$$
$$1275 \text{ } MB/S + 600 \text{ } MB/S = 1875 \text{ } MB/S$$

Assuming that the transfer efficiency of the memory is 65%, the following equations are obtained:

effective memory bandwidth=required memory bandwidth×(100÷65)≈2.9 GB/S required memory capacity ≈14 MB The above results show that in any one of the conditions (1) and (2), the required memory capacity does not affect system costs. This is because with recent development in DRAM processing technique, memory capacity has been increased, and even a memory with the smallest capacity has more than 128 MB per chip.

However, the transfer rate has a great effect on system costs in both of the cases of the conditions (1) and (2), because the required memory bandwidth is approximately from 2 GB/S to 3 GB/S.

In fact, when a DRAM configuration using ×32-bit width DDR-SDRAM's having an operating frequency of 200 MHz (the maximum transfer rate of 800 MB/S) and capable of processing the above required memory bandwidth, is estimated, the case (1) necessitates the use of three DDR-SDRAM chips, and the case (3) necessitates the use of four DDR-SDRAM chips.

Almost the same goes for a RDRAM.

In short, an increased number of memories are needed, and this increases system costs.

Further, there is a high possibility that research and development conducted in various ways will increase the transfer rate of a memory in the future. However, under the present circumstances, to increase the memory transfer rate is not so easy as to increase the memory capacity, when taking physical conditions for transfer, including a circuit board, into consideration.

To solve the above problem, beside the above described method of determining a required memory bandwidth in view of a maximum transfer rate of input and output, there has been proposed a method of writing into an OSD plane during each blank period of a horizontal or vertical synchronizing signal.

During the blank period, access to a moving picture plane is interrupted, and hence, it is possible to estimate a required memory bandwidth by removing a bandwidth for access to the OSD plane. Therefore, in the above example, the required bandwidth can be reduced as follows in each of the cases (1) and (2):

(1) 2.2 GB/S to 1.8 GB/S (2) 2.9 GB/S to 2.5 GB/S

However, according to this method, since processing of data of video sources is executed preferentially, when the number of screens or windows to be displayed on a multi-screen is increased, it is probable that OSD (GUI) drawing wait time will increase.

Particularly when a GUI screen, e.g., by data broadcasting, is to be drawn with acceleration, or when the stream-based data of a moving picture, e.g., of MPEG4, becomes an element of a GUI screen in the future, the above problem becomes a serious one, causing a user to visually notice a sense of incongruity during updating of the data, which can subject the user to a kind of stress.

To address this problem, there is another method of drawing an OSD image preferentially and limiting the number of screens that can be displayed simultaneously on a multi-screen during the OSD image. However, this method is not favorable to development in applications using a multi-screen since the degree of freedom is lost.

Therefore, there is a strong demand for a memory control method which gives a solution to this dilemma of meeting contradictory requirements, and contributes to reduction of system costs.

SUMMARY OF THE INVENTION

It is an object of the invention to provide a multi-screen synthesis apparatus and a control method and control program for controlling the multi-screen synthesis apparatus, which are capable of meeting requirements of multi-screen display function, and performing display of video data and update of an OSD image without causing a user to feel a visual sense of incongruity, and at the same time contributes to reduction of system costs.

To attain the above object, in a first aspect of the present invention, there is provided a multi-screen synthesis apparatus comprising a writing device that writes at least one periodic video data and at least one aperiodic OSD image data into a memory, a reading device that reads the video data and the OSD image data from the memory, based on layout information, a display control device that displays the video data and the OSD image data simultaneously on a single display, a frame decimation device that decimates data to be written into the memory in units of a frame on an input video source-by-input video source basis, a frame decimation control device that controls decimation of the data to be written into the memory in units of a frame on an input video source-by-input video source basis, and a display priority-determining device that determines display priority of the video data based on the layout information, wherein the frame decimation control device provides control such that when OSD image drawing is carried out in a state in which a number of multiple screens to be displayed exceeds a predetermined number of screens for multi-screen display, the frame decimation device performs decimation of frames of at least one input video source of which the video data is determined by the display priority-determining device to be lower in display priority, during periods of the OSD image drawing.

To attain the above object, in a second aspect of the present invention, there is provided a method of controlling a multi-screen synthesis apparatus comprising a writing step of writing at least one periodic video data and at least one aperiodic OSD image data into a memory, a reading step of reading the video data and the OSD image data from the memory, based on layout information, a display control step of displaying the video data and the OSD image data simultaneously on a single display, a frame decimation step of decimating data to be written into the memory in units of a frame on an input video source-by-input video source basis, a frame decimation control step of controlling decimation of the data to be written into the memory in units of a frame on an input video source-by-input video source basis, and a display priority-determining step of determining display priority of the video data based on the layout information, and wherein the frame decimation control step comprises providing control such that when OSD image drawing is carried out in a state in which a number of multiple screens to be displayed exceeds a predetermined number of screens for multi-screen display, decimation of frames of at least one input video source of which the video data is determined to be lower in display priority in the display priority-determining step is performed in the frame decimation step during periods of the OSD image drawing.

To attain the above object, in a third aspect of the present invention, there is provided a multi-screen synthesis apparatus comprising a writing device that writes at least one periodic video data and at least one aperiodic OSD image data into a memory, a reading device that reads the video data and the OSD image data from the memory, based on layout information, a display control device that displays the video data and the OSD image data simultaneously on a single display, a frame decimation device that decimates data to be written into the memory in units of a frame on an input video source-by-input video source basis, a frame decimation control device that controls decimation of the data to be written into the memory in units of a frame on an input video source-by-input video source basis, an attribute-determining device that determines attributes of the aperiodic OSD image data, and a display priority-determining device that determines display priority of the video data based on the layout information, and wherein the frame decimation control device provides control such that when OSD image drawing is carried out in a state in which a number of multiple screens to be displayed exceeds a predetermined number of screens for multi-screen display, at least one input video source lower in processing priority is determined based on the attributes and the display priority, and the frame decimation device performs decimation of frames of the at least one input video source lower in processing priority during periods of the OSD image drawing.

To attain the above object in a fourth aspect of the present invention, there is provided a method of controlling a multi-screen synthesis apparatus, comprising a writing step of writing at least one periodic video data and at least one aperiodic OSD image data into a memory, a reading step of reading the video data and the OSD image data from the memory, based on layout information, a display control step of displaying the video data and the OSD image data simultaneously on a single display, a frame decimation step of decimating data to be written into the memory in units of a frame on an input video source-by-input video source basis, a frame decimation control step of controlling decimation of the data to be written into the memory in units of a frame on an input video source-by-input video source basis, an attribute-determining step of determining attributes of mono-media of the aperiodic OSD image data, and a display priority-determining step of determining display priority of the video data based on the layout information, and wherein the frame decimation control step comprises providing control such that when OSD image drawing is carried out in a state in which a number of multiple screens being displayed exceeds a predetermined number of screens for multi-screen display, at least one input video source lower in processing priority is determined based on the attributes and the display priority, and decimation of frames of the at least one input video source lower in processing priority is performed during periods of the OSD image-drawing in the frame decimation step.

To attain the above object, in a fifth aspect of the present invention, there is provided a control program for causing a computer to control a multi-screen synthesis apparatus, comprising a writing module for writing at least one periodic video data and at least one aperiodic OSD image data into a memory, a reading module for reading the video data and the OSD image data from the memory, based on layout information, a display control module for displaying the video data and the OSD image data simultaneously on a single display, a frame decimation module for decimating data to be written into the memory in units of a frame on an input video source-by-input video source basis, a frame decimation control module for controlling decimation of the data to be written into the memory in units of a frame on an input video source-by-input video source basis, and a display priority-determining module for determining display priority of the video data based on the layout information, wherein the frame decimation control module provides control such that when OSD image drawing is carried out in a state in which a number of multiple screens to be displayed exceeds a predetermined number of screens for multi-screen display, the frame decimation module performs decimation of frames of at least one input video source of which the video data is determined by the display priority-determining module to be lower in display priority, during periods of the OSD image drawing.

To attain the above object, in a sixth aspect of the present invention, there is provided a control program for causing a computer to control a multi-screen synthesis apparatus, comprising a writing module for writing at least one periodic video data and at least one aperiodic OSD image data into a memory, a reading module for reading the video data and the OSD image data from the memory, based on layout information, a display control module for displaying the video data and the OSD image data simultaneously on a single display, a frame decimation module for decimating data to be written into the memory in units of a frame on an input video source-by-input video source basis, a frame decimation control module for controlling decimation of the data to be written into the memory in units of a frame on an input video source-by-input video source basis, an attribute-determining module for determining attributes of the aperiodic OSD image data, and a display priority-determining module for determining display priority of the video data based on the layout information, and wherein the frame decimation control module provides control such that when OSD image drawing is carried out in a state in which a number of multiple screens to be displayed exceeds a predetermined number of screens for multi-screen display, at least one input video source lower in processing priority is determined based on the attributes and the display priority, and the frame decimation module performs decimation of frames of the at least one input video source lower in processing priority during periods of the OSD image drawing.

The above and other objects, features, and advantages of the invention will become more apparent from the following detailed description taken in conjunction with the following drawings.

BRIEF DESCRIPTION OF THE DRAWING

FIG. 9 is a timing chart showing timing of operations performed by the decimation sections of the display system shown in FIG. 8 when frame decimation is not executed;

FIG. 10 is a timing chart showing timing of operations performed by the decimation sections of the display system shown in FIG. 8 when frame decimation is executed;

DETAILED DESCRIPTION OF THE PREFERRED EMBODIMENTS

The present invention will now be described in detail with reference to the drawings.

First Embodiment

First, a first embodiment of the present invention will be described with reference to FIGS. 1A to 12.

Figure 1A:
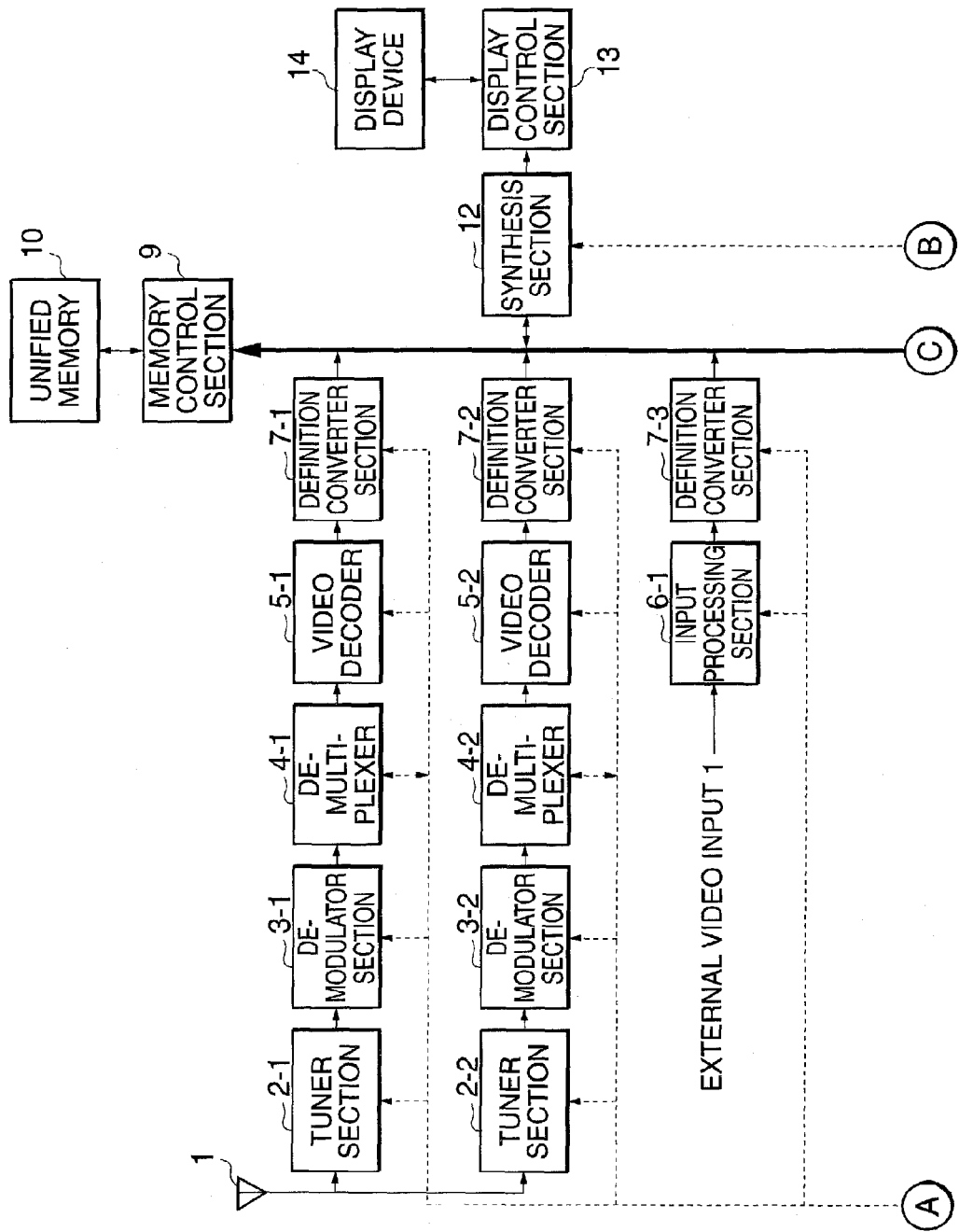
FIGS. 1A and 1B are block diagrams showing the arrangement of a display system including a multi-screen synthesis apparatus according to the first embodiment of the present invention.
Figure 1B:
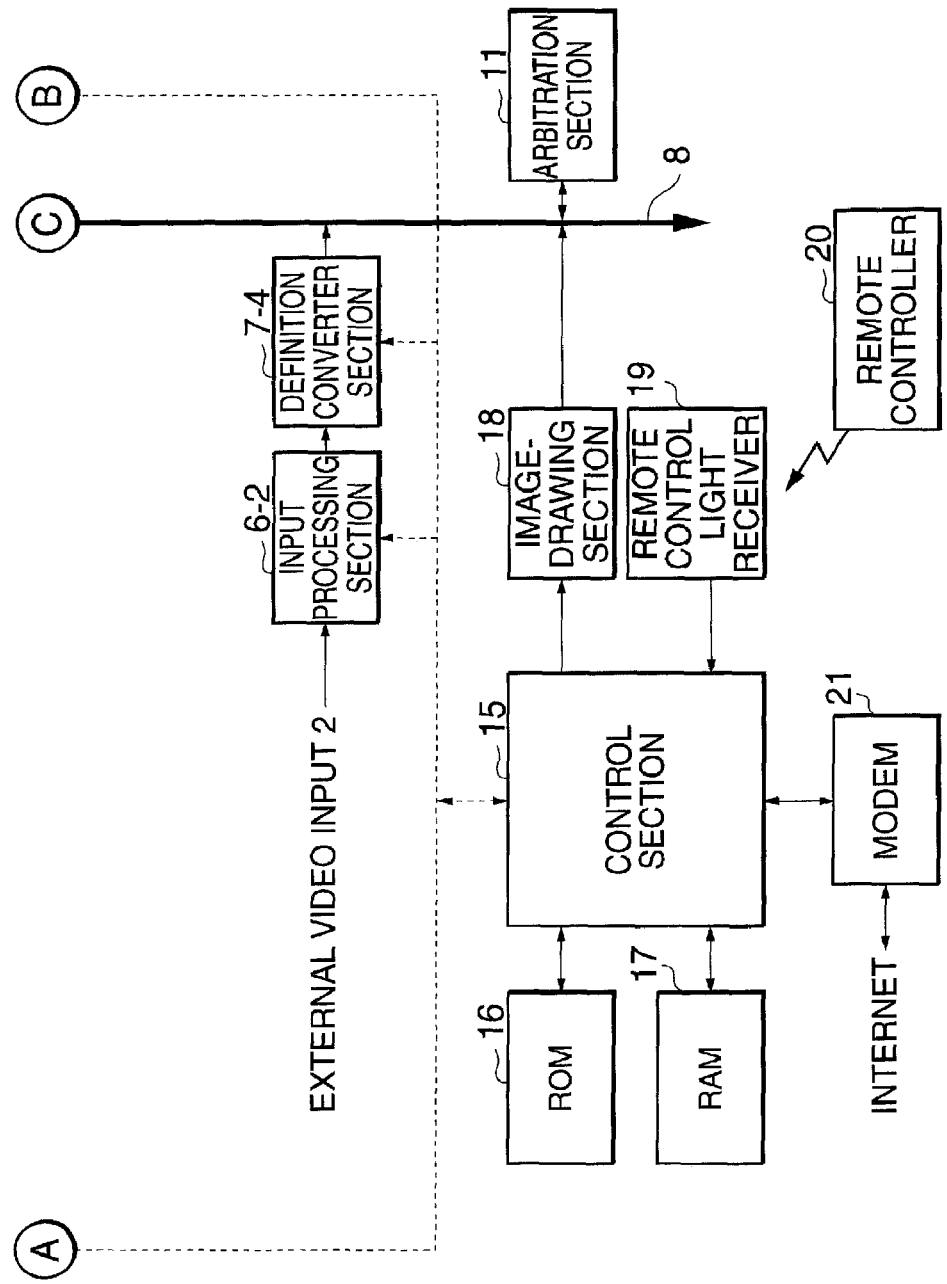
Figure 2:
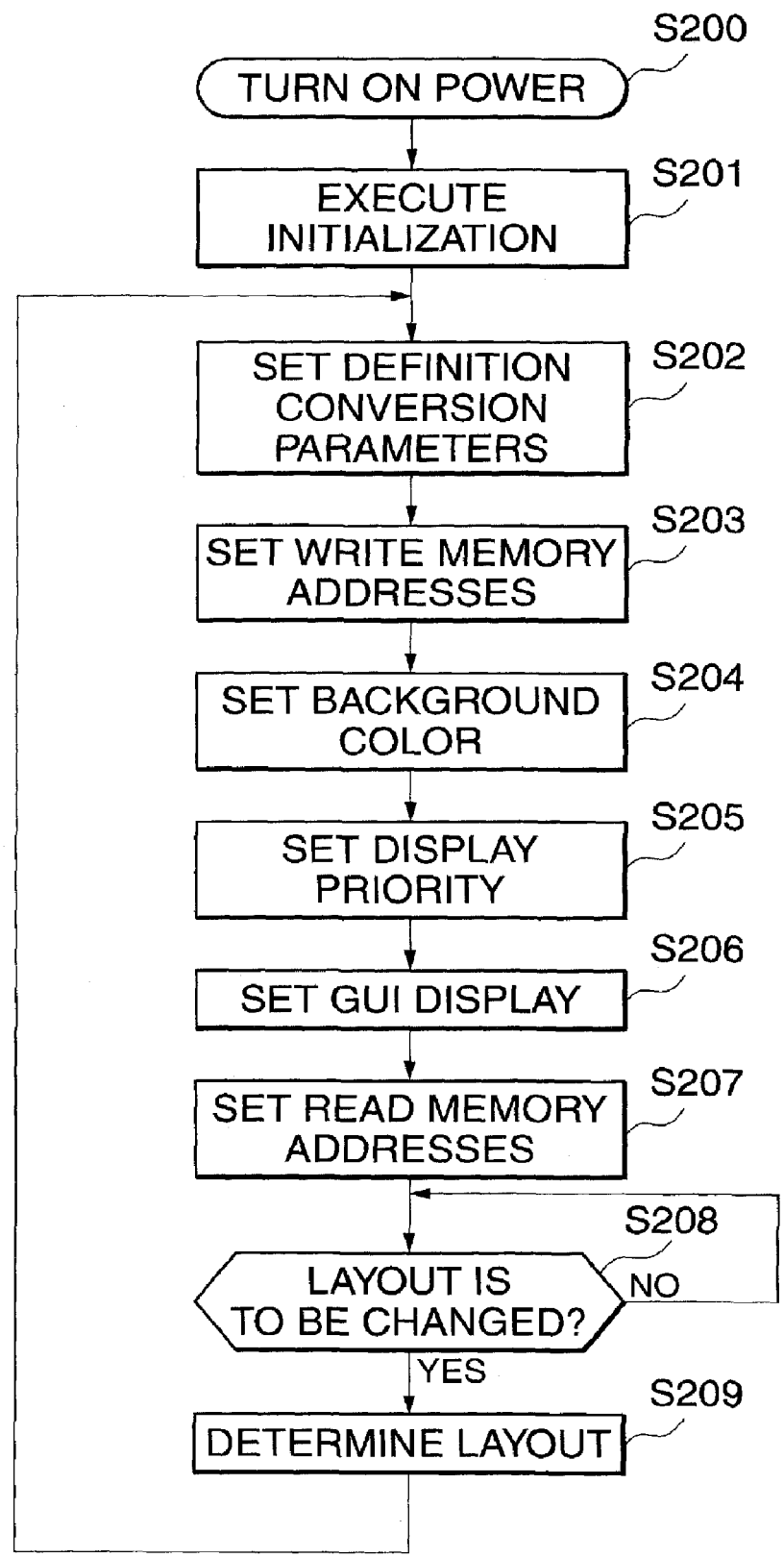
FIG. 2 is a flowchart showing a flow of operations of a multi-screen display process executed by the display system shown in FIG. 1.
Figure 3:
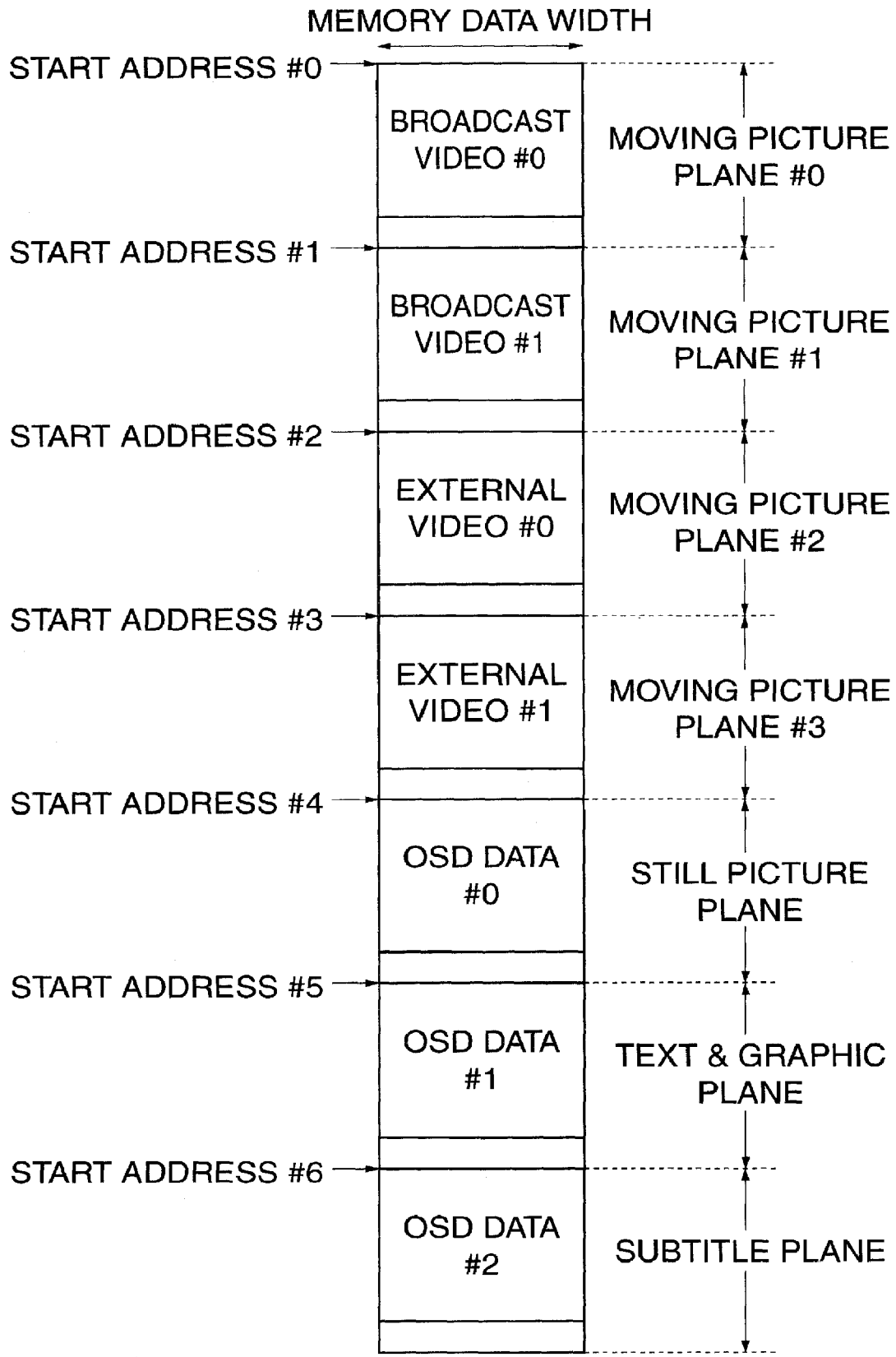
FIG. 3 is a diagram showing a logical address map of a unified memory used in the display system shown in FIG. 1.
Figure 4A:
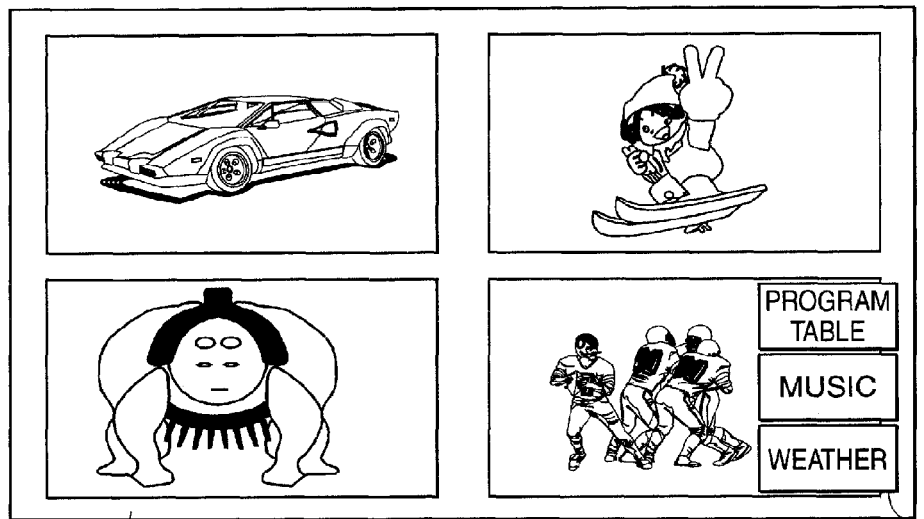
FIGS. 4A and 4B each illustrate an image example of a multi-screen displayed at the time of initialization of the multi-screen synthesis by the display system shown in FIG. 1.
Figure 4B:
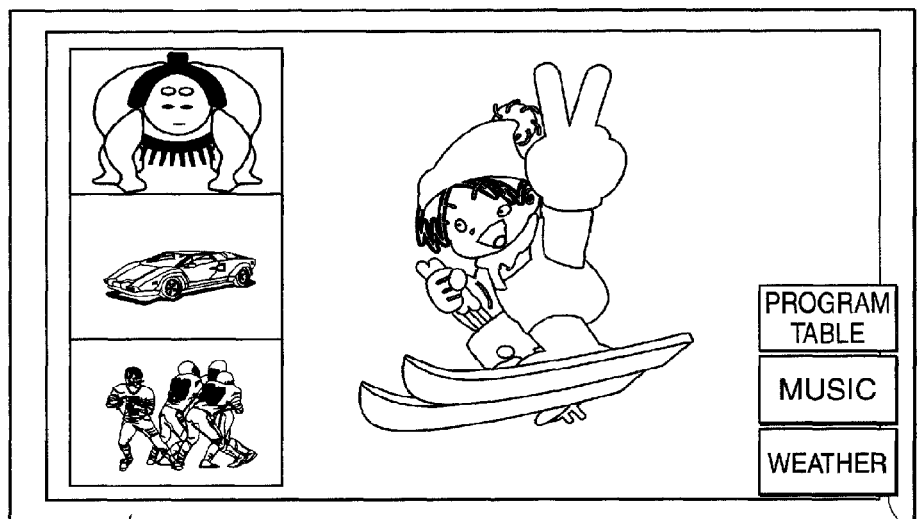
Figure 5:
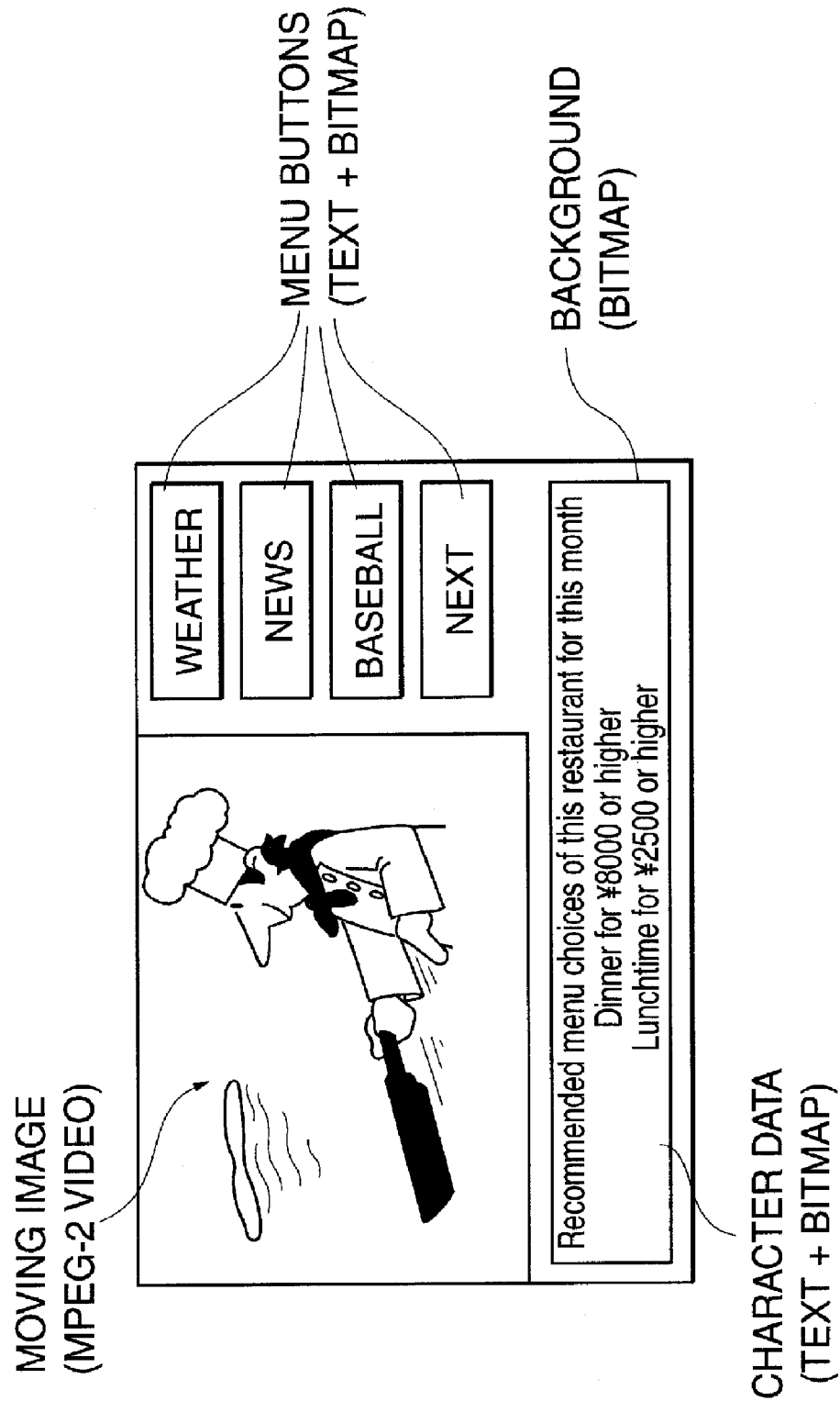
FIG. 5 is a diagram showing an image example of a data broadcast screen presented by the display system shown in FIG. 1.

FIGS. 1A and 1B are block diagrams showing the arrangement of a display system including a multi-screen synthesis apparatus according to the first embodiment of the present invention. FIG. 2 is a flowchart showing a flow of operations of a multi-screen display process executed by the display system shown in FIG. 1. FIG. 3 is a diagram showing a logical address map of a unified memory used in the display system shown in FIG. 1. FIGS. 4A and 4B each illustrate an image example of a multi-screen displayed at the time of initialization of the multi-screen synthesis by the display system shown in FIG. 1, while FIG. 5 is a diagram showing an image example of a data broadcast screen presented by the display system shown in FIG. 1.

The multi-screen synthesis apparatus according to the first embodiment of the present invention is configured to be capable of displaying, by multi-screen synthesis, screens of two independent broadcast video sources and two independent external input video sources, i.e., a total of four independent video sources on a single display, based on a predetermined layout. The number of video sources may be more than four or less than four.

Further, insofar as at least two broadcast video sources are included, the kinds of video sources whose data are handled in combination are arbitrary.

Referring first to FIG. 1, an antenna (parabolic antenna) 1 receives BS digital broadcasts and CS digital broadcasts. In the first embodiment, it is assumed by way of example that satellite broadcasts are received, but signals may be received through ground waves, optical cables, or the like. Tuner sections 2-1, 2-2 pass signals through band pass filters, down-converters, and so forth, and then deliver the resulting signals to demodulator sections 3-1, 3-2, respectively. The demodulator sections 3-1, 3-2 perform demodulation processes suitable for the respective forms of transmission of the signals of the sources, and at the same time carry out error-correcting processes, followed by delivering desired MPEG-2 transport streams to demultiplexers 4-1, 4-2. The demultiplexers 4-1, 4-2 separate the transport streams into MPEG-2 video data, MPEG-2 audio data, and additional information, of desired programs, respectively. The separate MPEG-2 audio data are decoded by audio decoders, not shown, and output as audio signals. By supplying the audio signals to an amplifier and speakers, the sound of any of the received programs can be heard. The separated MPEG-2 video data are decoded by video decoders 5-1, 5-2 and converted into video data in the raster scanning display format, and then delivered as data of broadcast video source to definition converter sections 7-1, 7-2 arranged at latter stages of the video decoders 5-1, 5-2, respectively. Further, the separated additional information is passed to a control section 15.

When the additional information relates to a data broadcast to be serviced by BS digital broadcasting, the control section 15 interprets a BML (Broadcast Markup Language) script to obtain a content scenario of a multi-media information service provider. This scenario is formed of structured content attributes (individual data of text, still pictures, moving pictures, sound and voice, etc., control information for specifying positions of the individual data on a screen, screen control information for updating the screen in response to operations by buttons or the like, and so forth). The control section 15 interprets the scenario and cooperates with an image-drawing section 18, referred to hereinafter, and the video decoders 5-1, 5-2 to form a data broadcast screen. On the other hand, when the additional information is EPG (Electrical Program Guide) information, the control section 15 interprets PSI/SI (Program Specific Information/Service Information) to obtain program information (e.g., programs, broadcast times, titles, categories, etc.).

Now, a brief description will be given of the data broadcast. With the advance of digital technology, broadcasting systems in which various kinds of information including broadcast signals are digitized have also been developed in the broadcasting industry. The development in the broadcasting system includes a new transmission method called "data carousel transmission." In this method, a content file of a multi-media service accompanying a program is repeatedly transmitted on an MPEG-2 transport stream, and a receiver receives the file in arbitrary timing during broadcasting. This enables the user to view latest news, weather forecast, results of professional baseball games, etc., on demand at any time. Further, the receiver integrates the function of telephone operating with a modem. This makes it possible to realize, through connection between users and a broadcast station, interactive services in which users are allowed to participate in a quiz program, a popularity vote program for selecting most popular movies, etc., provided by the broadcast station.

Input processing sections 6-1, 6-2 receive respective data of external video sources (external video input 1 and external video input 2). If the input processing section (6-1 or 6-2) is for receiving image data in the form of analog signals from a computer, it is configured to incorporate an A/D converter and a PLL (Phase Locked Loop) for sampling the image data. On the other hand, if it is for receiving digital signals, e.g., of LVDS (Low Voltage Differential Signaling), it is configured to incorporate a decoder and a differential buffer. Further, if it is for receiving a composite signal from a TV or a DVD, it is configured to incorporate a NTSC video decoder, a color converter circuit for converting a YUV signal to a RGB signal, an Interlace-Progressive converter circuit for converting interlace scanning to progressive scanning, etc. The signals of the above-mentioned kinds are each converted to the raster scanning format, and then passed as data of an external video source to a definition converter section 7-3 or 7-4 arranged at latter stages of the input processing sections 6-1, 6-2.

Based on a display format (the number of display lines, the number of dots, the number of colors) and preset multi-screen layout information, the control section 15 sets definition conversion parameters (an magnification ratio, a reduction ratio, a weighting filter coefficient for magnification/reduction, etc.), independently of each other, whereby the definition converter sections 7-1 to 7-4 perform magnifying/reducing/non-magnifying processing according to the parameters. In the present embodiment, the definition converter sections 7-1 to 7-4 are also configured to have respective bus interface functions for outputting four independent image data to a single common unified bus 8.

Images output from the respective definition converter sections 7-1 to 7-4 are delivered through the unified bus 8 to the unified memory 10 having a capacity corresponding to at least one screen of a display image (at least four screens of display images in the first embodiment) to be stored therein under the control of a memory control section 9. At the same time, responsive to a multi-window management instruction from the control section 15, a synthesis section 12 issues memory addresses at which an input image to be displayed is stored to the memory control section 9 to thereby read out display data from the unified memory 10 and finally achieve the multi-screen synthesis.

An arbitration section 11 scalably manages asynchronous accesses to the memory via the unified bus 8 according to priority. A display control section 13 performs display driving control, display format conversion, etc., in dependence on the characteristics of a display device 14, described hereinafter, in synchronism with the frame rate thereof. The display device 14 may be implemented by any device, such as a flat panel (of a liquid crystal type, a plasma type, or the like) with a matrix electrode structure or a CRT (cathode ray tube), insofar as it is capable of displaying images. The first embodiment is directed to a large-sized screen display capable of displaying high-definition images, such as high-vision video images for TV's and SXGA or higher definition images for PC's (personal computers).

The control section 15, which controls the overall operation of the display system including the multi-screen synthesis apparatus according to the first embodiment, is connected to a RAM (Random Access Memory) 17 for temporarily storing data from a CPU (Central Processing Unit) capable of computation and a ROM (read-only memory) 16 storing control programs, and includes a counter for counting time, a peripheral input/output interface, and so forth. Alternatively, the control section 15 may be implemented only by logics of software, or by a CPU or a media processor capable of performing parallel operation.

Programs for controlling the display system including the multi-screen synthesis apparatus according to the first embodiment may be stored in the ROM 16 or transmitted from an external apparatus via the peripheral input/output interface. Further, the ROM 16 stores a character font and the like on an as-needed basis, which is used for displaying character information of WWW and data broadcasting. Also connected to the control section 15 are a modem 21 for connecting the display system to the Internet (not only for Internet browsing and E-mail but also for interactive communication of data broadcasts), and a remote control light receiver 19 for receiving commands via infrared rays from a remote controller 20. The remote controller 20 may be implemented not only by an ordinary remote controller, but also by a keyboard, a mouse, or even a joy stick, which is capable of emitting infrared rays.

The image-drawing section 18 is responsive to image-drawing instructions from the control section 15, for generating GUI (Graphical User Interface), such as an OSD (On-Screen Display) screen, an EPG (Electronic Program Guide) screen, or a data broadcast screen, in the unified memory 10, by using accelerating functions, such as BitBlt (Bit-block transfer) and DMA (dynamic memory access).

Now, the operation of the display system including the multi-screen synthesis apparatus according to the first embodiment will be described hereinafter.

It should be noted that all the operations described in the following with reference to flowcharts are those of the control section 15.

First, multi-screen display operation will be described with reference to a flowchart shown in FIG. 2.

In FIG. 2, when the control section 15 detects the turning-on of the power in a step S200, it executes an initialization process in a step S201 as follows: The control section 15 obtains initial screen layout information (pieces of information of start/end points corresponding in number to the number of screens to be displayed, information of display priorities in the case of overlapping of screens, etc.) from the ROM 16. Then, for data of broadcast video sources, the control section 15 determines the formats of the data of broadcast video sources and default selection channels, and executes initialization of the tuner sections 2-1, 2-2, the demodulator sections 3-1, 3-2, the demultiplexers 4-1, 4-2, and the video decoders 5-1, 5-2, according to the determined formats and default selection channels. On the other hand, for data of external video sources, the control section 15 detects the kinds of the external video sources, and executes initialization of parameters set to the input processing sections 6-1, 6-2 according to the detected kinds of the data of external video sources so as to cause the input processing sections 6-1, 6-2 to receive the data of external video sources.

Then, the control section 15 determines the definition conversion parameters by calculating horizontal and vertical magnification/reduction ratios for horizontally and vertically magnifying or reducing the video image of each video source based on the screen layout information obtained in the step S201, and sets the definition conversion parameters to the definition converter sections 7-1 to 7-4 (step S202). Next, the control section 15 sets write memory addresses necessary for writing the outputs from the definition converter sections 7-1 to 7-4 in the unified memory 10, in a step S203.

As shown in the memory logical address map of FIG. 3, the unified memory 10 in the first embodiment is comprised of memory spaces respectively reserved for a total of seven planes: four moving picture planes #0 to #3 and three OSD planes (a still picture plane, a text & graphic plane, a subtitle plane) for GUI data in compliance with the ARIB (Association of Radio Industries and Businesses) standard.

Details of the method of forming an OSD plane are described in an ARIB standard document (ARIB STD TR-15: BS Digital Broadcasting Operational Stipulations).

Assigned to each of the planes is a memory space corresponding to a display definition of the display device 14. At a time point the outputs from the definition converter sections 7-1 to 7-4 are written in the unified memory 10, the outputs are not yet synthesized or composited for display. At this time, mainly the start addresses #0 to #6 in the memory logical address map of FIG. 3 are referred to by the definition converter sections 7-1 to 7-4 and the image-drawing section 18, and used as offset values of the write memory addresses generated by a write address generation section formed by the definition converter sections 7-1 to 7-4 and the image-drawing section 18.

Referring again to FIG. 2, a background color (pattern) to be used when a multi-window is displayed is set to the synthesis section 12 in a step S204. This background color is applied to no-video image area. Then, the display priorities obtained in the step S201 are set to the synthesis section 12 in a step S205. In this case, the OSD planes are assigned a top priority.

Then, the display setting of the GUI for multi-screen control is performed in a step S206 (the GUI includes all screens drawn by the control section 15, including a Web screen, an EPG screen, and further a data broadcast screen, and so forth). More specifically, the control section 15 issues a drawing command for drawing the GUI to the image-drawing section 18, and then writes in the unified memory 10 characters and other data each converted to the bitmap format, by using the accelerating functions of the image-drawing section 18, such as DMA and BitBlt, to thereby form a GUI screen. Then, read memory addresses are set, or in other words, various settings are performed to operate the synthesis section 12, in a step S207.

Now, the outline of operation of the synthesis section 12 will be briefly described.

The synthesis section 12 has a horizontal pixel counter and a vertical line counter that count the number of horizontal pixels and the number of vertical lines in the display area, respectively, based on horizontal and vertical synchronizing signals of the display device 14, thereby counting the number of raster scans during a display period. The control section 9 constantly generates read addresses in the OSD planes, based on the counts of the counters. The start addresses of the read addresses specify the start addresses #4, #5, #6, corresponding to desired OSD data, respectively, in the memory logical address map shown in FIG. 3. Only the text & graphic plane and the subtitle plane of the GUI data are drawn as 8-bit index data of a CLUT (Color Look Up Table) in the unified memory 10, and it is recommended in the ARIB standard that these index data should be converted to image data and α data by using the CLUT formed in the synthesis section 12, and synthesized or composited by an α arithmetic circuit formed in the synthesis section 12.

On the other hand, when it is determined, by referring to the screen layout information (coordinates of the start/end points of each of a broadcast video #0, a broadcast video #1, an external video #0, and an external video #1 in the above display area) set by the control section 15, that the counts of the counters match the area of any of the video sources, a read address is generated in the corresponding moving picture plane in the FIG. 3 memory logical address map. If there occurs a collision of reading requests, data of a video source given top priority in the display priority information set by the control section 15 is selected for reading, and the read addresses of the data of the other video sources are not generated.

Further, when it is determined that there are no data to be synthesized or composited, no read address is generated, and the background data set by the control section 15 is output. As a result, video data corresponding to the display layout are read out, whereby synthesis of the video data is achieved.

The GUI data and the data of the video sources are alternately read from the unified memory 10 by time division. As to the GUI data and multi-screen synthesis data (synthesized video data), selection of the GUI data, selection of the multi-screen synthesis data, alpha composition of the GUI data and the multi-screen synthesis data are performed in dependence on the α value, and then the synthesized data is output to the display control section 13, as final multi-screen synthesis data.

The above initialization produces an initial image of a multi-screen by the multi-screen synthesis as illustrated in FIG. 4A or 4B.

FIG. 4A shows an equally-quadripartite display screen with GUI, while FIG. 4B shows a quadripartite picture-in-picture display screen with GUI. These screens include portions represented by multi-screen background data and GUI data.

Referring again to FIG. 2, it is repeatedly determined in a step S208 whether or not the layout is to be changed, until the answer to this question becomes affirmative. Then, if it is determined that the layout is to be changed, a new layout is determined in a step S209. Thereafter, the steps S202 to S207 are repeatedly executed to change the layout of the multi-screen.

Now, a method of drawing a data broadcast screen will be briefly described.

Data broadcasting transmits various kinds of mono-media including moving pictures, voices, and still pictures, which are transmitted on the MPEG-2 transport stream by a stream system, and still pictures, text and graphics, which are transmitted by a carousel system. These mono-media are transmitted with attribute information added thereto which specifies the kinds of mono-media, thereby enabling the control section 15 to readily recognize the media attributes. Further, a script in a multi-media description language called BML (Broadcast Markup Language) is also transmitted, which combines these mono-media to realize multi-media expression intended by a broadcasting company.

As described above, in the display system including the multi-screen synthesis apparatus according to the first embodiment, data and information are separated by the demultiplexers 4-1, 4-2, and then, carousel-type mono-media and files, such as BML documents, are passed to the control section 15 so as to be stored in the RAM 17, while stream-type mono-media are transmitted to the video decoders 5-1, 5-2 so as to be decoded thereby.

To present a data broadcast screen, the control section 15 decodes the carousel-type mono-media and at the same time causes the image-drawing section 18 to draws elements, such as a background, text data, and menu buttons, in the OSD planes in the unified memory 10, based on screen layout information written on a CSS (Cascading Style Sheet) in the BML script. Further, the script contains description of details of properties of each element, such as a character size, a color, a scale, a size, and a display position on an absolute coordinate system, and hence uniqueness of presentation of each element can be maintained.

A moving picture, such as a broadcast video as stream-type mono-media, is magnified or reduced by the definition converter sections 7-1, 7-2, as necessary, based on the screen layout information, and then drawn in the moving picture plane #0 or the moving picture plane #1 in the unified memory 10. In current operation of the stream-type mono-media, images of MPEG2-VIDEO or the like are drawn in a moving picture plane, but in the future, there is a high possibility that a sophisticated amalgam of data broadcasting and the Internet will make it possible to draw mono-media of MPEG4-VIDEO or the like in an OSD plane. In other words, although at present, moving pictures drawn in an OSD plane are almost limited to animation images in an MNG (Multiple-image Network Graphics) format or the like, OSD planes are very likely to be used not only for still picture-based contents, but also for moving picture-based contents in the future.

The layout information for presentation of a data broadcast screen is passed from the control section 15 to the synthesis section 12, and the synthesis section 12 changes the read addresses, as required, based on the information to generate appropriate addresses in the memory control section 9, whereby a data broadcast screen, an example of which is illustrated in FIG. 5, is presented as intended by a broadcasting company.

FIG. 5 illustrates the construction of a screen formed by combining a moving image (MPEG-2 video), text & graphic information, and a background (bitmap). As shown in the figure, the text & graphic information is comprised of menu buttons (text+bitmap) controllable by the remote controller 20, and character data (text+bitmap). The menu buttons each have special attributes, such as focus characteristics, added thereto, so as to allow selection by the remote controller 20. When menu selection is made, another screen is obtained from the carousel system again, and after execution of the same procedure as described above, the data broadcast screen is switched to a new one.

Thus, an interactive scenario of data broadcasting is realized based on a predetermined procedure.

As described hereinbefore, the object of the present invention is to provide a multi-screen synthesis apparatus which is capable of performing not only simultaneous display of a plurality of screens of broadcast video images and video images from peripheral devices on a multi-screen, but also smooth graphical display of a GUI screen of a data broadcast, a UI (User Interface), or the like, without causing a user to feel a sense of incongruity, and at the same time makes it possible to realize such advantageous display functions at a low cost.

The cost reduction can be achieved by assigning the memory bandwidth of the unified memory 10 appearing in FIGS. 1A and 1B only to moving video sources which are periodically updated, but not to GUI (OSD) images which are only aperiodically updated, as described hereinbefore.

Next, a description will be given of a control method for causing both a video input and a GUI (OSD) image to be updated under the above system conditions without giving a sense of incongruity to a user with reference to FIG. 6 (this starts the description of the features essential to the present invention).

Figure 6:
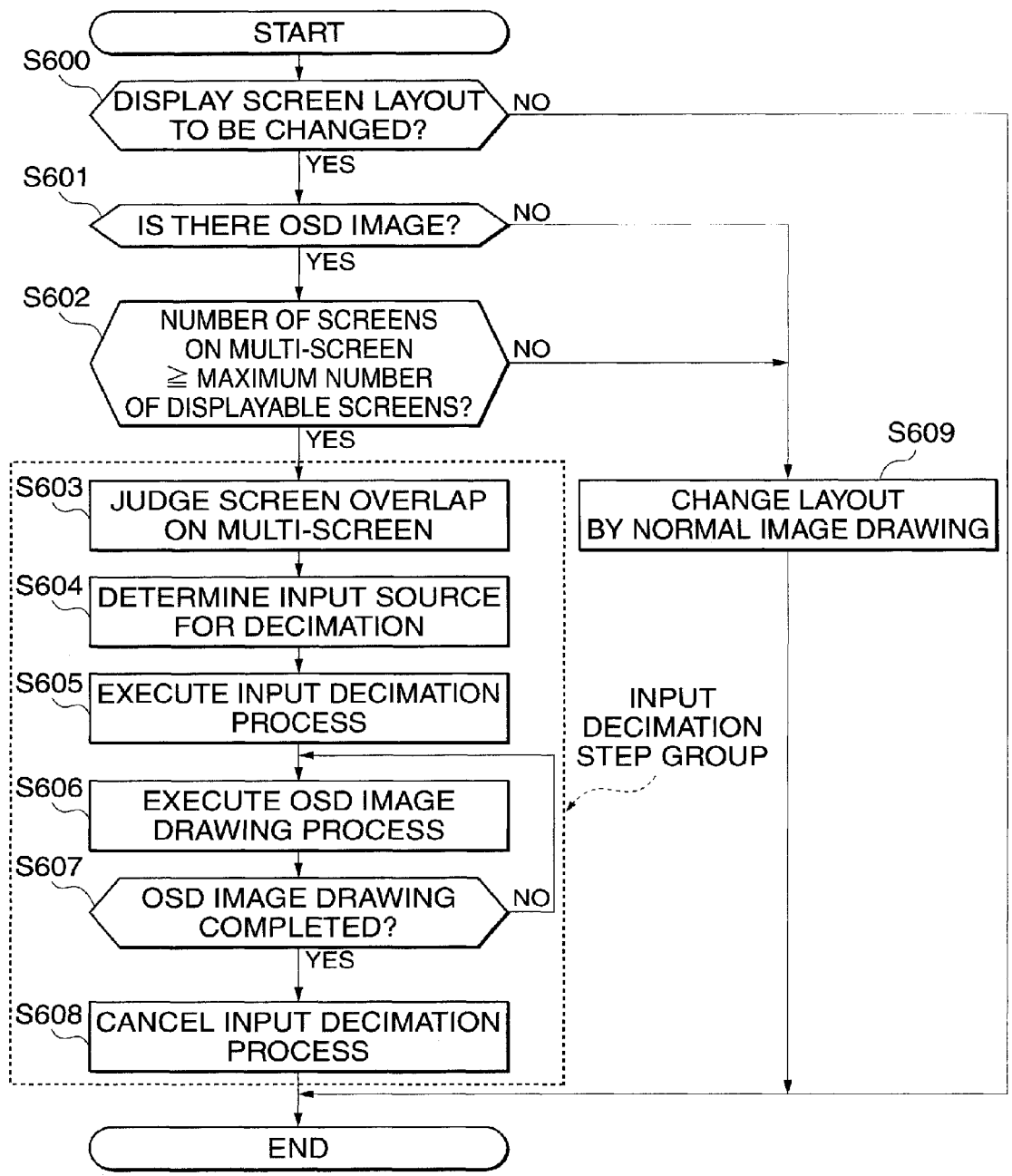
FIG. 6 is a flowchart showing a flow of operations of a multi-screen layout-based decimation process executed by the display system shown in FIG. 1.

FIG. 6 is a flowchart showing a flow of operations of a multi-screen layout-based decimation process executed by the display system shown in FIG. 1.

As shown in FIG. 6, first, it is determined in a step S600 whether or not the layout of a display screen is to be changed by the control section 15. If the layout is to be changed, it is determined in a step S601 whether or not there is an OSD image to be drawn. If there is no OSD image, since the display system has a sufficient memory bandwidth for processing moving pictures, only the display layout is changed in a step S609 while continuing normal image drawing, similarly to the process described with reference to FIG. 2.

On the other hand, if it is determined in the step S601 that there is an OSD image to be drawn, it is determined in a step S602 whether or not the number of screens to be displayed on the multi-screen after the layout change is equal to or larger than the maximum number (four in the first embodiment). If it is determined that the number of the screens on the multi-screen after the layout change is smaller than the maximum number, the process proceeds to the step S609, whereas if it is determined that the number of the screens after the layout change is equal to or larger than the maximum number, the process proceeds to an input decimation step group (steps S603 to S608) boxed by broken lines in FIG. 6.

More specifically, first in the input decimation step group, it is determined in the step S603 whether or not screens overlap in the multi-screen. For example, in an image example of screens overlapping on a multi-screen shown in FIG. 7, the display priorities assigned to the moving picture planes can be expressed, as VP1>VP0>VP3 and VP2>VP3.

Figure 7:
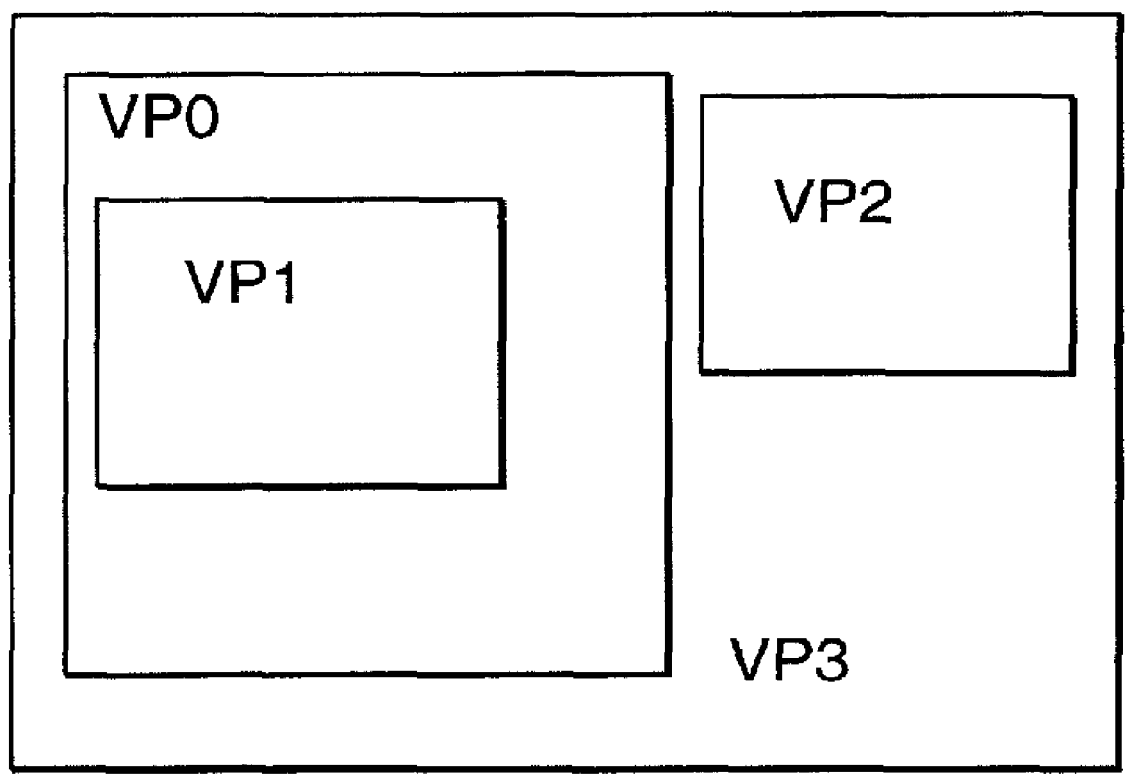
FIG. 7 is a diagram illustrating an image example of screens overlapping on a multi-screen and displayed by the display system shown in FIG. 1.

In FIG. 7, VP0 represents a video image in the moving picture plane #0, VP1 a video image in the moving picture plane #1, VP2 a video image in the moving picture plane #2, and VP3 a video image in the moving picture plane #3.

Referring again to FIG. 6, data of one input source for decimation is determined in the step S604. In the first embodiment, the video image VP3, which is determined in the step S603 to have the lowest display priority, is determined as that of a video source for decimation. This is because it is convenient to the user to select a portion least visible when displayed, as an object for decimation. Then, the input decimation is executed in the step S605 to ensure that the memory bandwidth is sufficient for drawing OSD images.

Now, an input decimation method will be described with reference to FIG. 8.

Figure 8A:
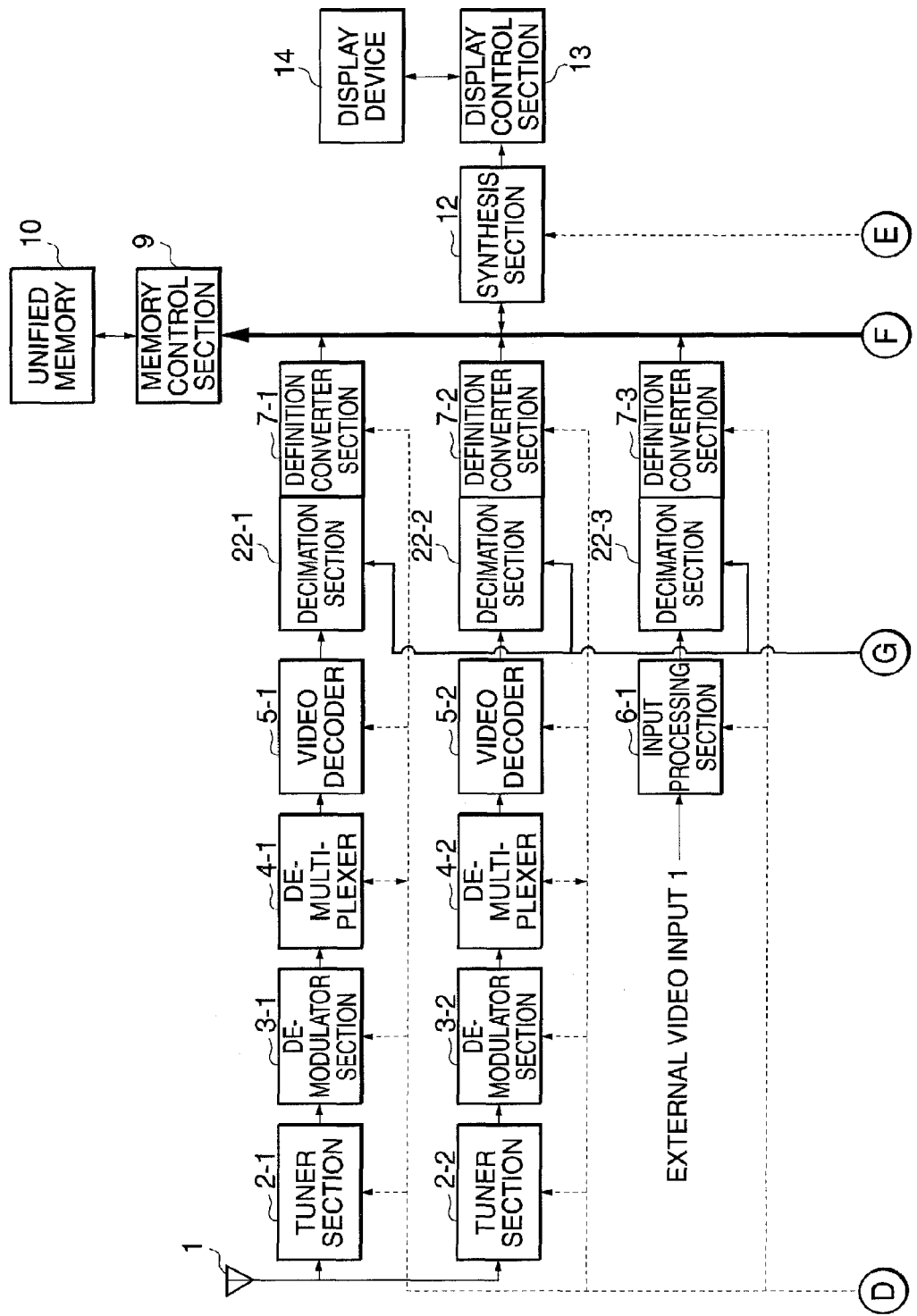
FIG. 8 is a block diagram showing the arrangement of a display system including the display system shown in FIGS. 1A and 1B and sections each having an input frame decimation function explicitly and additionally shown herein.
Figure 8B:
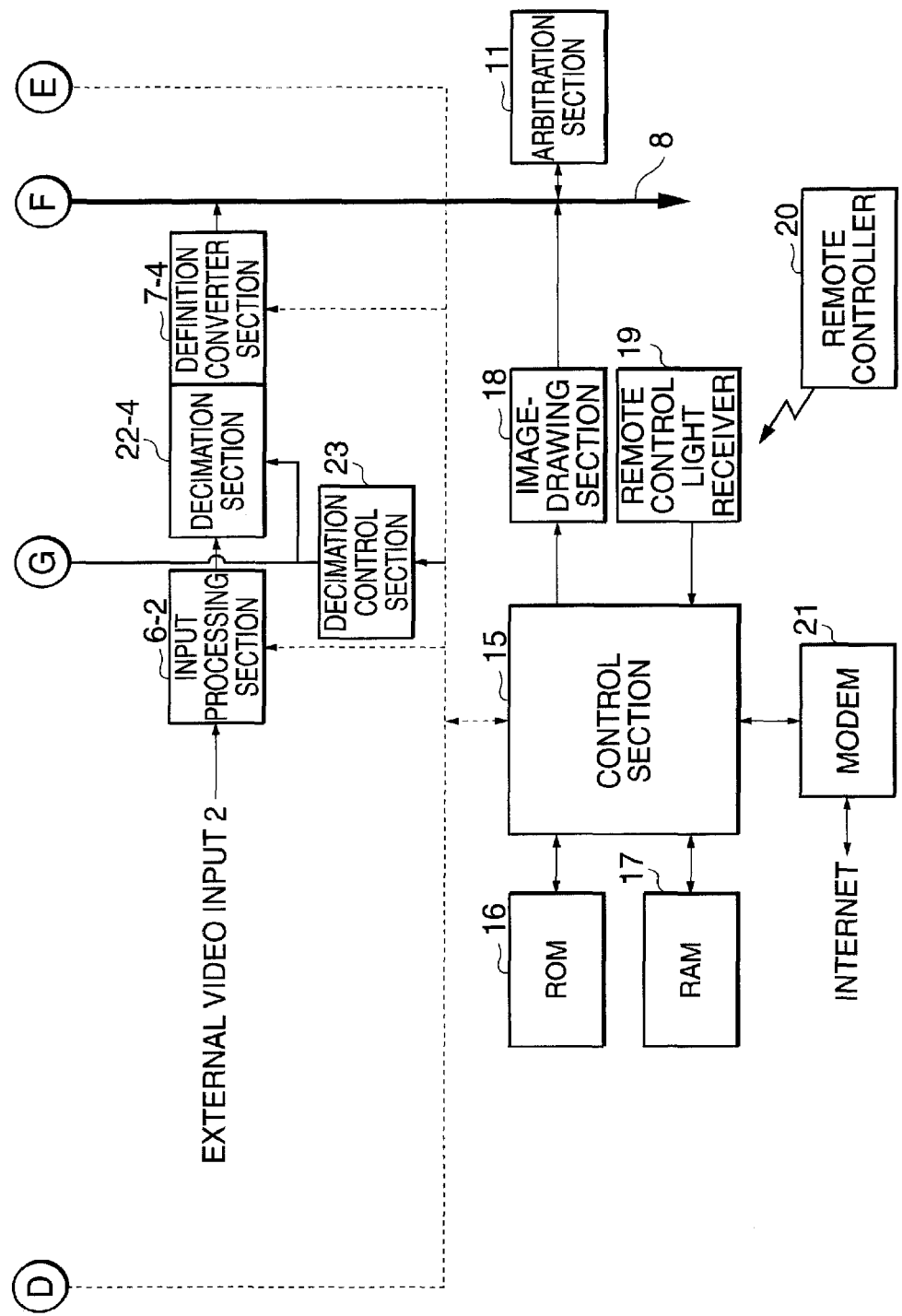

FIG. 8 is a block diagram showing the arrangement of a display system including the display system shown in FIGS. 1A and 1B and sections each having an input frame decimation function explicitly and additionally shown herein. Component parts and elements of the system shown in FIG. 8 corresponding to those of the system shown in FIGS. 1A and 1B are designated by identical reference numerals, detailed description thereof is omitted.

The display system shown in FIG. 8 is distinguished from the display system shown in FIGS. 1A and 1B in that decimation sections 22-1 to 22-4 and a decimation control section 23 are additionally arranged on the upstream sides of the definition converter sections 7-1 to 7-4.

The decimation method employed by the decimation sections 22-1 to 22-4 is simple, and will be described below with reference to FIGS. 9 and 10.

FIG. 9 is a timing chart showing timing of operations performed by the decimation sections of the display system shown in FIG. 8 when frame decimation is not executed, while FIG. 10 is a timing chart showing timing of operations performed by the decimation sections of the display system shown in FIG. 8 when frame decimation is executed. Each box containing "valid" in FIG. 9 indicates execution of memory writing, whereas each box containing "invalid" in FIG. 10 indicates inhibition of memory writing.

As shown in FIGS. 9 and 10, the interface signals employed in this system are the basic general raster signals of VSYNC (vertical synchronizing signal) 30, HSYNC (horizontal synchronizing signal) 31, DE (data enable signal) 32, and input video data 34, and an additional signal of FMASK (frame mask signal) 33.

In normal data processing of an input video, as shown in FIG. 9 illustrating the case of "no frame decimation", the input video data 34 is regarded as valid during periods over which the FMASK 33 is held "L" and the DE 32 is held "H", and writing of the video data 34 into the unified memory 10 via the definition converter sections 7-1 to 7-4 is continuously performed. On the other hand, in the case of "frame decimation" illustrated in FIG. 10, the FMASK 33 changes to "H" in synchronism with VSYNC 30. As a result, the input video data 34 can be masked during a time period over which DE 32 is held "H", and hence as a matter of fact, the definition converter sections 7-1 to 7-4 arranged downstream of the decimation sections 22-1 to 22-4 regard the input video data 34 as invalid and inhibit writing of the same into the unified memory 10. This makes it possible to realize the frame decimation with ease.

Next, the decimation control section 23 will be described. The main function of the decimation control section 23 is to generate an FMASK signal in each of the decimation sections 22-1 to 22-4 in response to an instruction from the control section 15.

Figure 11:
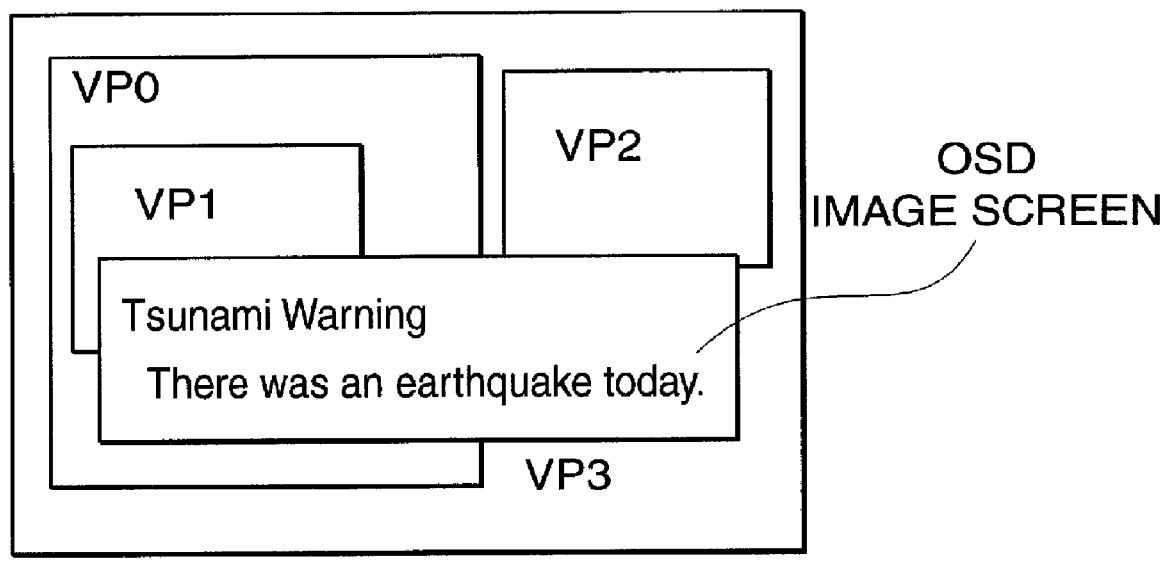
FIG. 11 is a diagram showing an image example of input video source screens and an OSD screen displayed by the display system shown in FIG. 8.
Figure 12A:
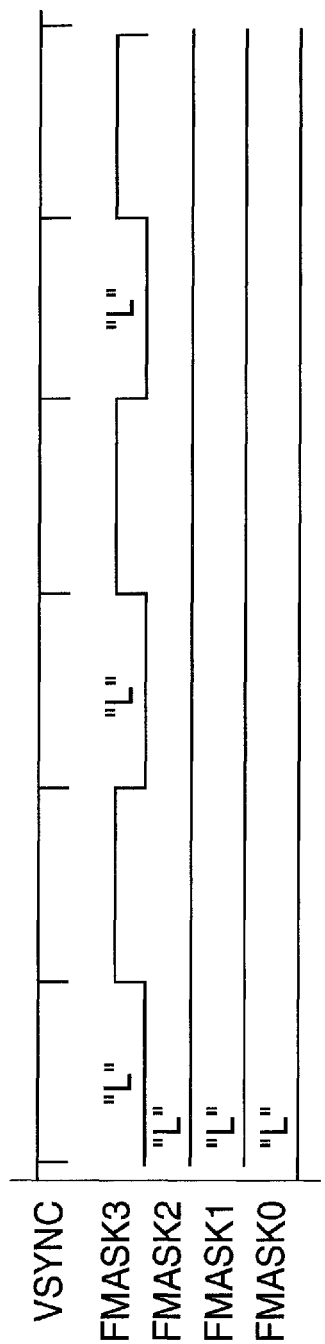
FIGS. 12A and 12B form timing charts showing timing of frame decimation performed on data of one video source by the display system shown in FIG. 8.
Figure 12B:
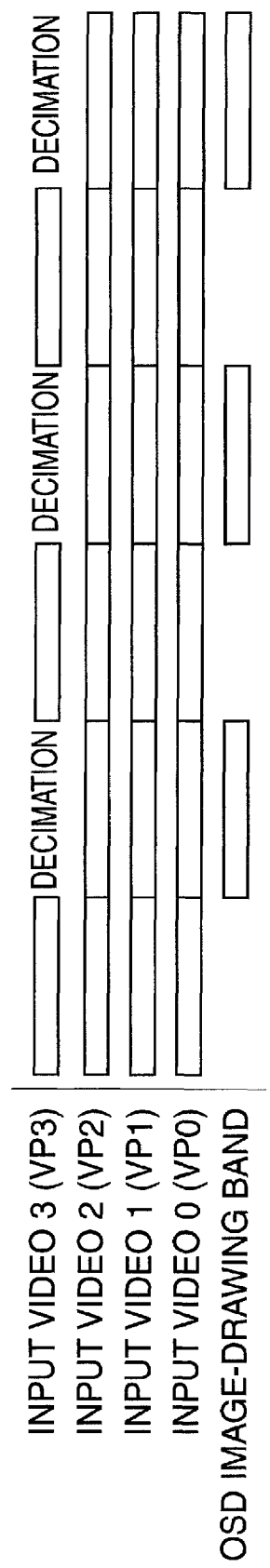

FIG. 11 is a diagram showing an image example formed by drawing an OSD image on the image example of screens overlapping on the multi-screen shown in FIG. 7. FIGS. 12A and 12B are timing charts showing timing of frame decimation performed on data of one video source by the display system shown in FIG. 8, in which FIG. 12A shows timing of occurrences of the signal VSYNC and the signals FMASK0 to FMASK3, while FIG. 12B shows timing of occurrences of input videos 0 to 3 and an OSD image-drawing band.

In the case of the image shown in FIG. 11, VP0 represents a video image in the moving picture plane #0, VP1 a video image in the moving picture plane #1, VP2 a video image in the moving picture plane #2, and VP3 a video image in the moving picture plane #3.

In decimating the image shown in FIG. 11, the decimation control section 23 generates the signals FMASK3 to FMASK1 as shown in FIG. 12A, so as to subject the video image VP3 to decimation for the reason mentioned hereinbefore. In the first embodiment, the video image VP3 has every other frame thereof subjected to decimation (½ decimation) at corresponding periodic time intervals so as to prevent the appearance of the updated input video from being impaired by decimation. It has been empirically confirmed by using an actual system that even when frame decimation is performed during OSD image drawing periods, particularly as performed in the first embodiment, human eyes can hardly notice the resulting changes with a sense of incongruity.

During time periods corresponding to frame decimation of the input video source of VP3, a memory area assigned to the video image VP3 can be freed for the OSD image drawing, as shown in FIG. 12B. The OSD image drawing is performed during these decimation periods in a step S606 in FIG. 6. Then, it is determined in a step S607 whether or not the OSD image drawing is completed. If it is determined that the OSD image drawing is not completed, the process returns to the step S606, whereas if it is determined that the OSD image drawing is completed, the input decimation is canceled in a step S608 to free the OSD image-drawing band. More specifically, the decimation control section 22 switches the signal FMASK3 to "L", whereby the system returns to the normal drawing mode.

If it is determined in the step S600 that the display screen layout is not to be changed, or if the step S609 is completely executed, or if the input decimation step group is completely executed, the present process is terminated.

As described above, even if aperiodic OSD image drawing is to be executed which may cause the memory bandwidth required for the image-drawing operations to exceed the maximum memory bandwidth of the unified memory 10, the lowermost video image of the overlapping images is determined, based on multi-screen display layout, to be a video source whose processing priority is low, and writing of the input video data is inhibited during each OSD image drawing period corresponding to one frame of the input data to thereby reduce the number of frames of the input data. This makes it possible to realize the control of the unified memory such that the display of images of video sources and the update of an OSD image can be achieved without causing the user to feel a sense of incongruity, and the costs of the display system can be reduced.

The first embodiment is described assuming that the respective signals VSYNC of the four input videos are completely synchronous or a common signal. However, there can be a case in which the four input videos have respective signals VSYNC which are quite different from each other and asynchronous. This case will be described in detail in a fourth embodiment hereinafter.

Second Embodiment

Next, a second embodiment of the present invention will be described with reference to FIG. 13.

Figure 13:
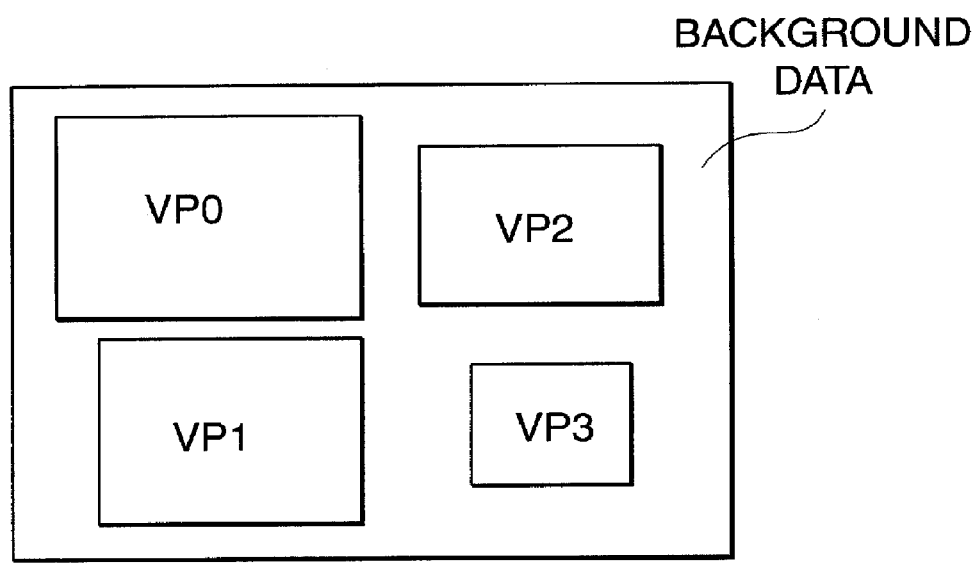
FIG. 13 is a diagram showing an image example of screens overlap on a multi-screen displayed by a display system including a multi-screen synthesis apparatus according to a second embodiment of the present invention.

FIG. 13 is a diagram showing an image example of screens overlap on a multi-screen displayed by a display system including a multi-screen synthesis apparatus according to a second embodiment of the present invention. In FIG. 13, VP0 represents a video image in the moving picture plane #0, VP1 a video image in the moving picture plane #1, VP2 a video image in the moving picture plane #2, and VP3 a video image in the moving picture plane #3.

The arrangement of the display system including the multi-screen synthesis apparatus according to the second embodiment is basically the same as that of the display system of the first embodiment shown in FIG. 1, and hence the following description will be given with reference to FIG. 1.

In the above first embodiment, the frame decimation control method is described which is executed in cases where screens including those for P-in-P (picture-in-picture) display overlap on a multi-screen as in the image example shown in FIG. 7. However, this method cannot cope with a case where multi-screen display does not contain screens overlapping in layout as shown in FIG. 13.

To overcome this problem, the second embodiment provides a further improvement over the prior art.

The procedure of operations of the multi-screen synthesis in the second embodiment is basically similar to that in the first embodiment, and hence only different points will be described.

The second embodiment is distinguished from the first embodiment only by a method of determining an input video source for decimation. More specifically, in the second embodiment, instead of determining the display priorities of screens by judgment of an overlapping condition of screens on a multi-screen, the sizes of the display areas (horizontal definition×number of vertical lines) of input video sources on the multi-screen are compared with each other, and data of an input video source having the smallest display area is determined to be data for decimation (corresponding to the step S603 in FIG. 6).

In the image example shown in FIG. 13, the display priorities assigned to the moving picture planes according to the decreasing order of the sizes of the display areas can be expressed by using the respective symbols of video images in the corresponding planes, as VP0>VP1>VP2>VP3. Therefore, in the second embodiment, the video image VP3 determined by its size to be of a source having a lowest priority is subjected to the decimation (corresponding to the step S604 in FIG. 6). The following operations are similar to those in the first embodiment described above, and hence the same advantageous effects can be expected.

Although in the second embodiment and the first embodiment described above, data of an input video source for decimation is determined by the respective methods distinguished from each other, as one based on "screen overlap-based display priorities" and the other based on "display area-based display priorities", this is not limitative, but the two methods may be amalgamated with each other.

Further, in a mode of display in which a main screen and slave screens are combined, or in another mode in which discrimination in priority has been clearly made between screens, e.g., between a highlighted screen focused and selected out of the screens and non-highlighted screens, data of an input video for decimation may be selected not by the above methods, but by the control section 15.

Third Embodiment

Next, a third embodiment of the present invention will be described with reference to FIGS. 14 to 16B.

The arrangement of a display system including a multi-screen synthesis apparatus according to the third embodiment is basically the same as that of the display system of the first embodiment shown in FIG. 1, and hence the following description is given with reference to FIG. 1.

Figure 14:
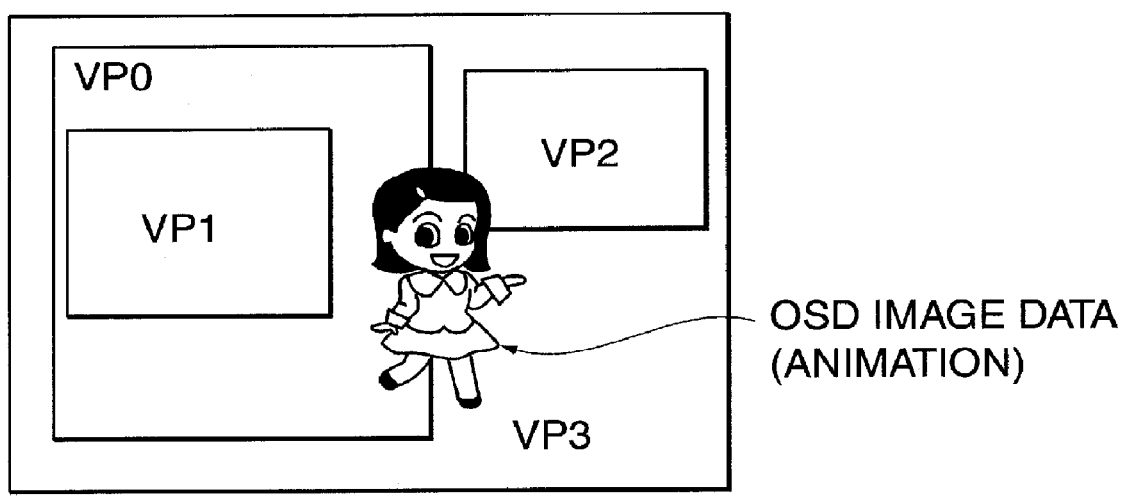
FIG. 14 is a diagram showing an image example of a synthesis screen containing an OSD image with a moving picture attribute, displayed on a multi-screen by a display system including a multi-screen synthesis apparatus according to a third embodiment of the present invention.

FIG. 14 is a diagram showing an image example of a synthesis screen containing an OSD image with a moving picture attribute, displayed on a multi-screen by a display system including a multi-screen synthesis apparatus according to a third embodiment of the present invention. In the figure, VP0 represents a video image in the moving picture plane #0, VP1 a video image in the moving picture plane #1, VP2 a video image in the moving picture plane #2, and VP3 a video image in the moving picture plane #3. OSD data is for animation.

Figure 15:
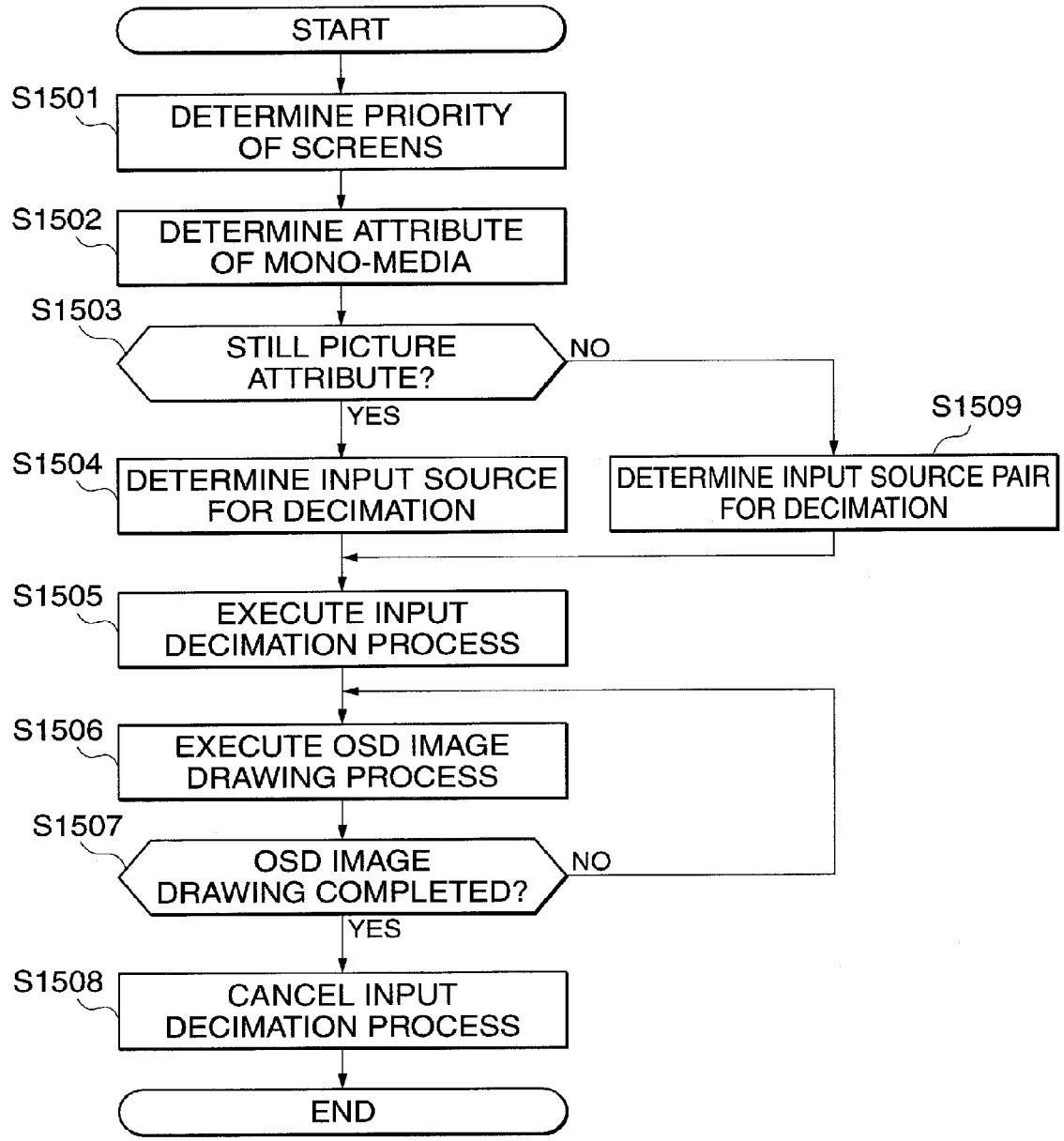
FIG. 15 is a flowchart showing a flow of operations of a multi-screen layout-based decimation process executed by the display system including the multi-screen synthesis apparatus according to the third embodiment.

FIG. 15 is a flowchart showing a flow of operations of a multi-screen layout-based decimation process executed by the display system including the multi-screen synthesis apparatus according to the third embodiment.

Figure 16A:
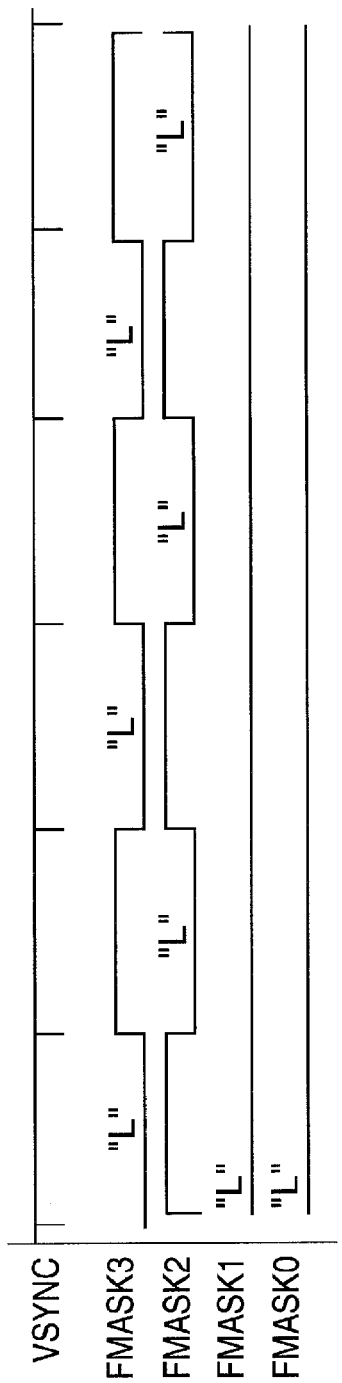
FIGS. 16A and 16B form timing charts showing timing of frame decimation performed on data of video sources by the display system including the multi-screen synthesis apparatus according to the third embodiment.
Figure 16B:
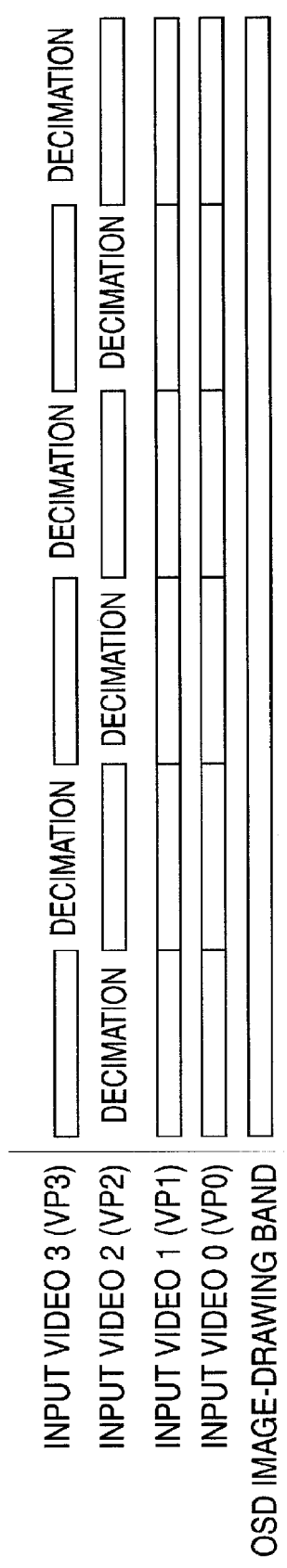

FIGS. 16A and 16B are timing charts showing timing of frame decimation performed on data of two video sources by the display system including the multi-screen synthesis apparatus according to the third embodiment. FIG. 16A shows timing of occurrence of a signal VSYNC and signals FMASK0 to FMASK3, while FIG. 16B shows timing of occurrences of input videos 0 to 3 and an OSD image band.

The frame decimation control methods of the first and second embodiments are described by way of example based on the cases in which one input video source determined to be a low-priority source is selected for frame decimation. These frame decimation control methods of the first and second embodiments are effective enough to prevent the appearance of an ordinary OSD image formed by drawing a still picture-based pattern from being impaired when it is updated. However, when an animation image or the like, e.g., in the MNG format, such as one shown in the FIG. 14 image example, is desired to be moved more smoothly, the memory bandwidth sometimes becomes insufficient for drawing the OSD image.

Further, this problem is expected to become more conspicuous and serious in the future when considering cases where mono-media of MPEG4-VIDEO or the like is drawn in an OSD plane, or where animation characters and the like are drawn three-dimensionally.

The third embodiment provides a solution to this problem. In the following, the decimation control method of the present embodiment will be described with reference to a flowchart shown in FIG. 15.

The method of FIG. 15 is an improvement over that of FIG. 6, wherein the input decimation step group boxed by the broken lines in FIG. 6 is modified.

First, the display priorities of the multiple screens are determined in a step S1501. The method of this determination is the same as that of the first embodiment described above. Then, the attributes of the OSD mono-media to be drawn are determined in a step S1502. In particular, the third embodiment is characterized in determination of whether the OSD mono-media has a moving picture attribute or a still picture attribute. In the case of digital broadcasting, each mono-media of BML-based contents received as a data broadcast has media attributes added thereto, so that the control section 15 can readily identify the attributes of mono-media to be drawn.

For example, the discrimination of mono media in a data broadcast between the still picture attribute and the moving picture attribute can easily be effected according to following classifications:

still picture attribute: JPEG, PNG (Portable Network Graphics), MPEG2-I frame, draw data, etc.

moving picture attribute: JPEG, MNG (Multiple-image Network Graphics), etc.

Then, it is determined in a step S1503 whether or not the mono-media is an OSD image with a still picture attribute. If the mono-media is an OSD image with a still picture attribute, it is only required that steps S1504 to S1508 are executed similarly to the frame decimation control process described in the first embodiment. The steps S1504 to S1508 are the same as the steps S604 to S608 in FIG. 6, and hence description thereof is omitted.

If it is determined in the step S1503 that the OSD image has not a still picture attribute, but a moving picture attribute, a pair of input video sources (data thereof) are determined for decimation in a step S1509.

More specifically, it is only required to determine data of two low-priority input video sources, and hence data of the source of the video image VP2 whose display area is small and data of the source of the video image VP3 whose screen overlap-based priority is low are determined as the data of input video sources for decimation in the example shown in FIG. 14.

After execution of the step S1509, the input decimation is carried out in a step S1505 to ensure that the memory bandwidth is sufficient for also processing the OSD image having the moving picture attribute.

In this case, the decimation control section 22 selects the data of the sources of the video images VP2 and VP3 for decimation as described above, and generates the signals FMASK3 to FMASK1 as shown in FIG. 16A.

In the third embodiment, the data of the sources of the video images VP3 and VP2 are alternately decimated for each frame period at corresponding periodic time intervals (½ decimation for each of the input video sources), so as to prevent the appearances of the video images from being impaired due to decimation when the input signals are updated. In particular, by decimating the data of the two input video sources alternately, it is possible to free the wide unused memory area for an OSD image having a moving picture attribute. During periods of execution of the frame decimation, OSD image drawing is performed in a step S1506 in FIG. 15. Then, it is determined in a step S1507 whether or not the OSD image drawing is completed. If OSD image drawing is completed, the input decimation process is canceled in a step S1508 to free the OSD image-drawing band as shown in FIG. 16B.

More specifically, the decimation control section 22 switches the signals FMASK3 and FMASK2 to "L", whereby the system returns to the normal drawing mode.

As described above, according to the multi-screen synthesis apparatus according to the third embodiment, even if aperiodic drawing of an OSD image having a moving picture attribute is to be executed which may cause the memory bandwidth required for the image-drawing operations to exceed the maximum memory bandwidth of the unified memory 10, based on multi-screen display layout, the above control makes it possible to achieve the display of video sources and the update of the OSD image without causing the user to feel a sense of incongruity, and reduce the costs of the display system incorporating the multi-screen synthesis apparatus.

Fourth Embodiment

Next, the fourth embodiment of the present invention will be described with reference to FIGS. 17A to 17E, and FIG. 18.

The arrangement of a display system including a multi-screen synthesis apparatus according to the fourth embodiment is basically the same as that of the display system of the first embodiment shown in FIG. 1, and hence the following description is given with reference to FIG. 1.

Figure 17A:
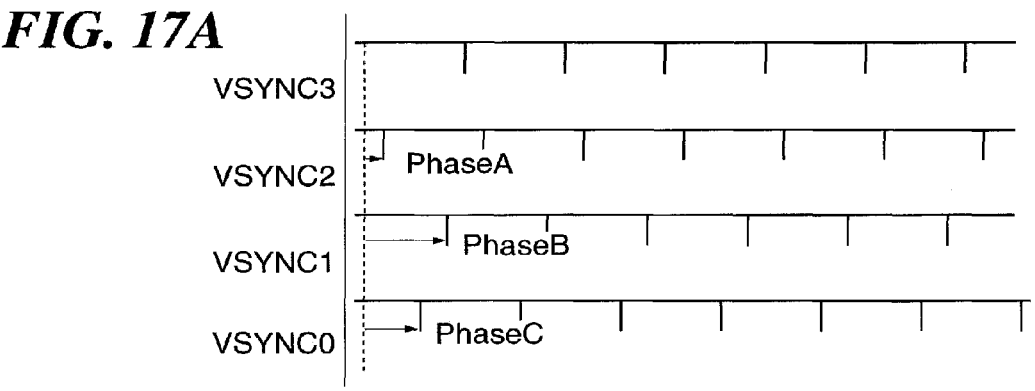
FIGS. 17A to 17E form timing charts showing timing of frame decimation performed on data of video sources by a display system including a multi-screen synthesis apparatus according to a fourth embodiment of the present invention when inputs are asynchronous.
Figure 17B:
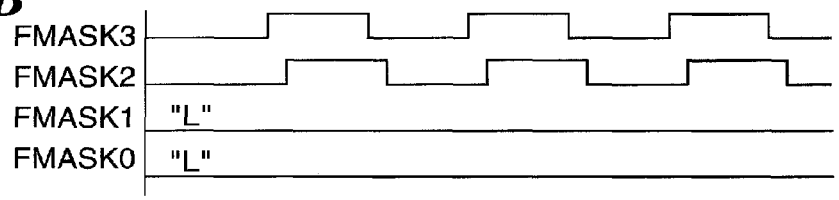
Figure 17C:
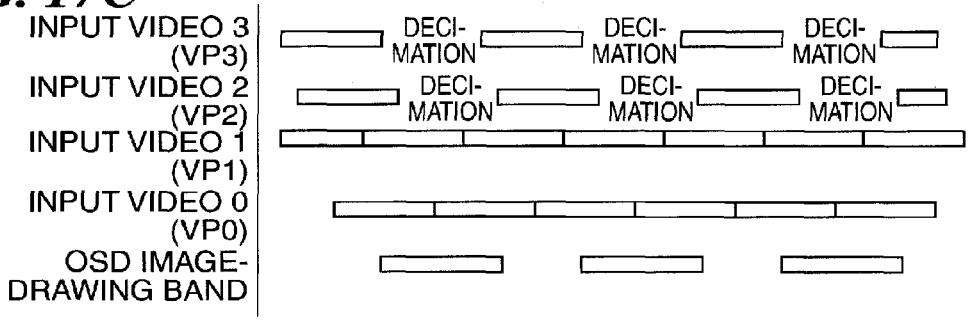
Figure 17D:
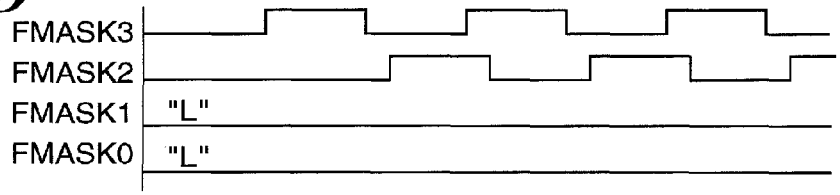
Figure 17E:
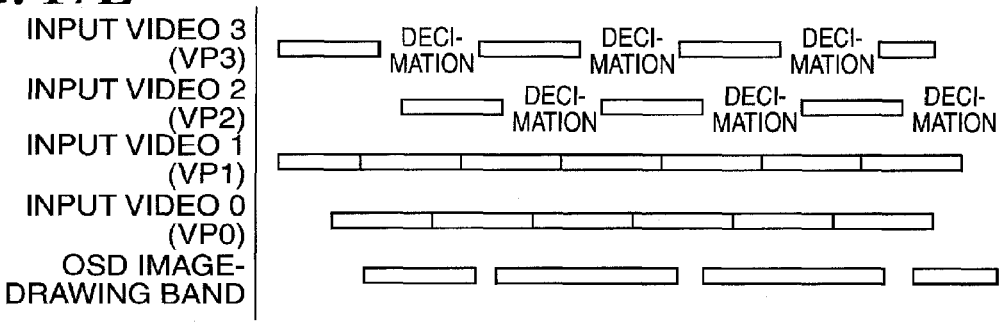

FIGS. 17A to 17E form timing charts showing timing of frame decimation performed on video sources by a display system including a multi-screen synthesis apparatus according to a fourth embodiment of the present invention when inputs are asynchronous. FIG. 17A shows timing of occurrences of signals VSYNC0 to VSYNC3. FIG. 17B shows timing of occurrences of signals FMASK0 to FMASK3 in a case where the OSD image-drawing band is minimized, while FIG. 17C shows timing of occurrences of input videos 0 to 3 and the OSD image-drawing band when the OSD image-drawing band is minimized. Further, FIG. 17D shows timing of occurrences of the signals FMASK0 to FMASK3 in a case where the OSD image-drawing band is maximized, while FIG. 17E shows timing of occurrences of the input videos 0 to 3 and the OSD image-drawing band when the OSD image-drawing band is maximized.

The above first to third embodiments are described, by way of example, based on the synchronous system in which the signals VSYNC of the four input videos serving as a reference for synchronization when the decimation control section 22 generates the signals FMASK are completely synchronous or a common signal. In the fourth embodiment, however, the system is an asynchronous one in which the four input videos have respective independent signals VSYNC (VSYNC3 to VSYNC0). A decimation control method of the fourth embodiment is described below.

The basic concept of decimation control in the fourth embodiment is similar to those in the above embodiments, and hence only different points will be described.

Similarly to the decimation methods in the above synchronous systems, the decimation method in the asynchronous system is also applied to the two roughly categorized cases:

(1) a case where an OSD image having a still picture attribute is drawn.

(2) a case where an OSD image having a moving picture attribute is drawn.

In the above case (1), it is just required to select data of one low-priority input video source for decimation in the same step of determining data of an input source for decimation, as described in the first or second embodiment.

The fourth embodiment is distinguished from the first to third embodiments only in that the signals FMASK3 to FMASK0 are generated in synchronism with the signals VSYNC3 to VSYNC0, respectively.

On the other hand, in the above case (2), the fourth embodiment is the same as the third embodiment in that data of two low-priority input video sources are selected for decimation. In this case, the important point to the decimation control section 22 is how to generate the signals FMASK such that the OSD image-drawing band can be broadened.

This point is described in detail with reference to FIGS. 17A to 17E and 18.

In the case of the display pattern shown in FIG. 14, the video sources (data thereof) of the videos VP3 and VP2 are considered to be a low-priority input pair, as described above. However, depending on a FMASK-generating method employed by the decimation control section 22, there are two different cases, i.e., a case exemplified by CASE 1 shown in FIG. 17B which minimizes the OSD image-drawing band and a case exemplified by CASE 2 shown in FIG. 17D which maximizes the OSD image-drawing band. CASE 1 is an example in which the signals FMASK3 and FMASK2 are generated such that a pulse of FMASK3 is generated in synchronism with a pulse of VSYNC3, and a pulse of FMASK2 is generated in synchronism with a first pulse of VSYNC2 generated immediately after the generation of the pulse of FMASK3, to thereby perform decimation of the data of the pair of video sources. On the other hand, CASE 2 is an example in which the signals FMASK3 and FMASK2 are generated such that a pulse of FMASK3 is generated in synchronism with a pulse of VSYNC3, and a pulse of FMASK2 is generated in synchronism with a second pulse of VSYNC2 generated after the generation of the above-mentioned pulse of FMASK3, to thereby perform decimation of the data of the pair.

As described above, simply by changing timing for generating a first FMASK pulse, it is possible to obtain a larger OSD image-drawing band in CASE 2 than in CASE 1, and hence a display system capable of selecting the former case (CASE 2) is more advantageous.

Figure 18:
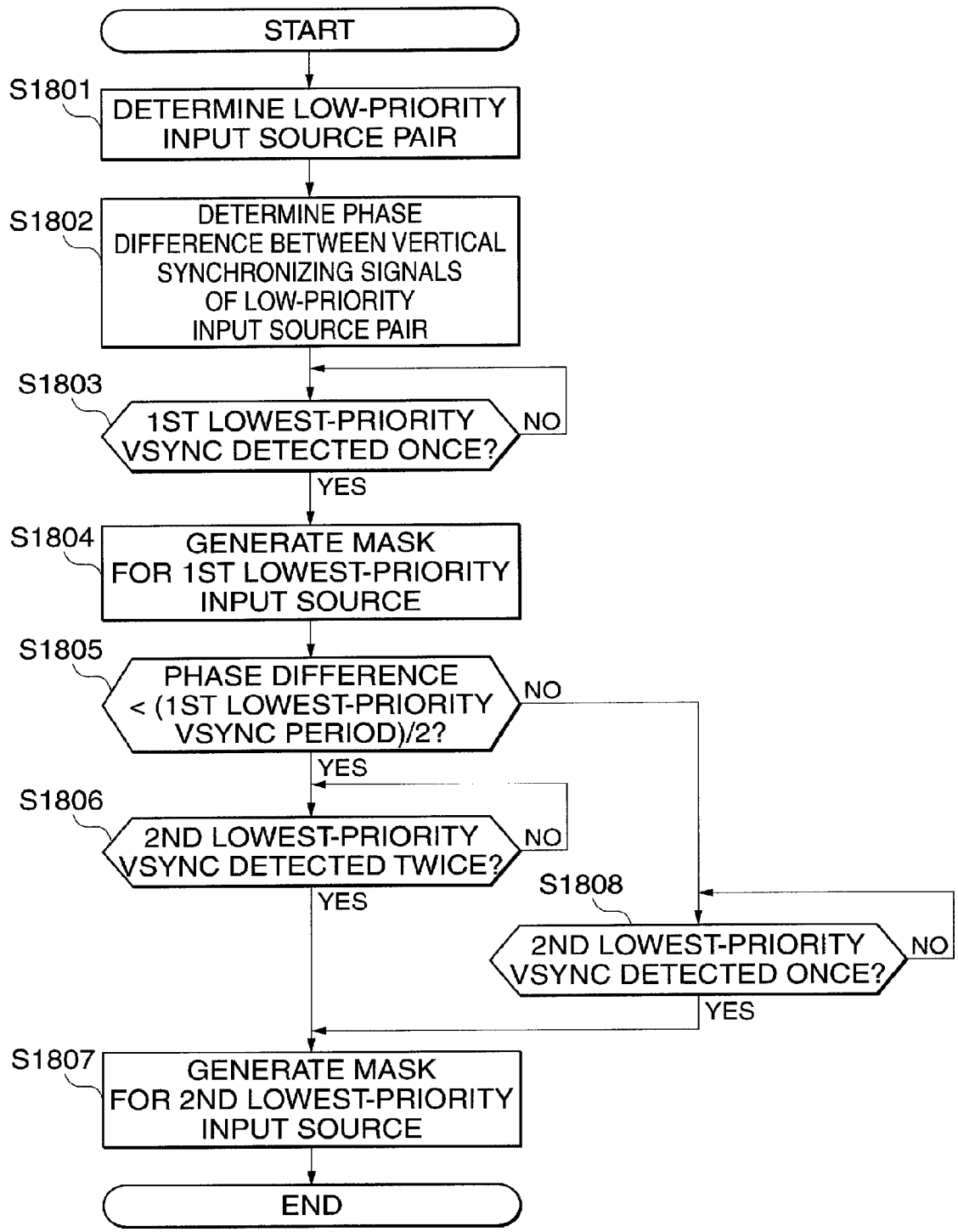
FIG. 18 is a flowchart showing a flow of operations of a multi-screen layout-based decimation process executed on asynchronous channels by the display system including the multi-screen synthesis apparatus according to the fourth embodiment.

A method of causing the display system to select the case (CASE 2) automatically will be described below with reference to a flowchart shown in FIG. 18.

First, data of a pair of low-priority input video sources are determined in a step S1801. In the fourth embodiment, the data of the sources of the video images VP3 and VP2 are the pair, and the data of the video image VP3 is the data of the lowest-priority source. Then, a phase difference between the vertical synchronizing signals of the pair (|VSYNC3−VSYNC2|) is determined in a step S1802. Phase A in FIG. 17A corresponds to this phase difference. Thereafter, the decimation of the data of the lowest-priority source is started first. More specifically, it is determined in a step S1803 whether or not the vertical synchronizing signal VSYNC (VSYNC3 in the present example) corresponding to the data of the lowest-priority input video source is detected once. This step is repeatedly executed until the signal VSYNC is actually detected once. Then, if the signal VSYNC is detected once, the signal FMASK (FMASK3 in the present example) corresponding to the data of the lowest-priority input video source is generated at periodic time intervals in synchronism with the frame of this video source in a step S1804. Then, the decimation of the data of the second lowest-priority source is started. More specifically, it is determined in a step S1805 whether or not the phase difference determined in the step S1802 is smaller than half of a VSYNC period of the lowest-priority input video source. In the example of FIG. 17A, Phase A<(VSYNC period of VSYNC3)/2 holds, and hence the process proceeds to a step S1806.

In the step S1806, it is determined whether or not the signal VSYNC (VSYNC2 in the present example) corresponding to the second lowest-priority input video source is detected twice. This step is repeatedly executed until the signal VSYNC is actually detected twice. Then, if the signal VSYNC is detected twice, a pulse of the FMASK (FMASK2 in the present example) corresponding to the second lowest-priority input video source is generated at periodic time intervals in synchronism with the frame of this video source in a step S1807. The execution of this step causes the system to automatically select CASE 2 where the OSD image-drawing band is maximized.

Further, if it is determined that the phase difference determined in the step S1802 is equal to or larger than half of a VSYNC period of the lowest-priority input video source (the case of Phase B in the example shown in FIG. 17A)(NO to S1805), the process proceeds to a step S1808.

In the step S1808, it is determined whether or not the signal VSYNC (VSYNC2 in the present example) corresponding to the second lowest-priority input video source is detected once. This step is repeatedly executed until the signal VSYNC is actually detected once. Then, if the signal VSYNC is detected once, the signal FMASK corresponding to the second lowest-priority input video source is generated at periodic time intervals in synchronism with the frame of the this video source in the step S1807. The execution of this step causes the system to automatically execute frame decimation such that the OSD image-drawing band is maximized.

Although in the above description, it is assumed that the vertical synchronizing signals of the four inputs are asynchronous, when the progressive display system of a television is considered, vertical synchronizing signals in actual use all have the same frame rate (approximately 60 Hz in normal cases).

However, the vertical synchronizing signals are different and asynchronous in phase. That is, asynchronism in the fourth embodiment means that the vertical synchronizing signals have substantially the same frame rate, but are different in phase.

It is additionally stated that the present invention has been made with a view to assigning a broader part of the memory bandwidth to the drawing of an OSD image in actual use.

As described therefore, even if there occurs aperiodic drawing of an OSD image with a moving picture attribute, which causes the total necessary memory bandwidth to exceed the maximum memory bandwidth of the unified memory 10, based on multi-screen display layout, and the display system has asynchronous inputs, it is possible to realize the control of the unified memory such that the display of images of input video sources and the update of the OSD image can be achieved without causing a user to feel a sense of incongruity, and the costs of the display system can be reduced.

Other Embodiments

It goes without saying that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiments, and hence the storage medium in which the program code is stored constitutes the present invention.

Examples of the storage medium for supplying the program code include a floppy disk (registered trademark), a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A multi-screen synthesis apparatus comprising:
a writing unit that writes video data and OSD image data into a memory;
a reading unit that reads the video data and the OSD image data from the memory, based on layout information;
a display control unit that synthesizes and displays the video data and the OSD image data on a display unit;
a frame decimation unit that decimates frames of the video data to be written into the memory;
a control unit that controls decimation of the frame of the video data to be written into the memory; and
a display priority-determining unit that determines display priority of the video data based on the layout information,
wherein said control unit controls said frame decimation unit to decimate the frames of the input video data determined by said display priority-determined unit to be lower in display priority, during periods of the drawing of the OSD image is being carried out, in the case that a number of screens to be displayed on said display unit exceeds a predetermined number.

2. A multi-screen synthesis apparatus according to claim 1, wherein the predetermined number of screens for multi-screen display corresponds to a number of periodic video data assigned to a memory bandwidth of the memory.

3. A multi-screen synthesis apparatus according to claim 1, wherein said display priority-determining unit determines video data laid lower in screen overlap position in multi-screen display to be lower in display priority.

4. A multi-screen synthesis apparatus according to claim 1, wherein said display priority-determining unit determines video data having a smaller display area in multi-screen display to be lower in display priority.

5. A method of controlling a multi-screen synthesis apparatus, comprising:
a writing step of writing video data and OSD image data into a memory;
a reading step of reading the video data and the OSD image data from the memory, based on layout information;
a display control step of synthesizing and displaying the video data and the OSD image data on a display unit;
a frame decimation step of decimating frames of the video data to be written into the memory;
a control step of controlling decimation of the frame of the video data to be written into the memory; and
a display priority-determining step of determining display priority of the video data based on the layout information,
wherein said control step comprises providing control such that the decimation of the frames of the input video data determined by said display priority-determined step to be lower in display priority is performed, during periods of the drawing of the OSD image is being carried out, in the case that a number of screens to be displayed on said display unit exceeds a predetermined number.

6. A non-transitory computer-readable storage medium storing a control program executable by a computer to control a multi-screen synthesis apparatus, the control program comprising:
a writing module for writing video data and OSD image data into a memory;
a reading module for reading the video data and the OSD image data from the memory, based on layout information;
a display control module for synthesizing and displaying the video data and the OSD image data on a display unit;
a frame decimation module for decimating frames of the video data to be written into the memory;
a frame decimation control module for controlling decimation of the frames of the video data to be written into the memory; and
a display priority-determining module for determining display priority of the video data based on the layout information,
wherein said control module provides control such that the decimation of the frames of the input video data determined by said display priority-determined module to be lower in display priority is performed, during periods of the drawing of the OSD image is being carried out, in the case that a number of screens to be displayed on said display unit exceeds a predetermined number.

* * * * *